(12) United States Patent
Boshernitsan et al.

(10) Patent No.: US 9,317,399 B2
(45) Date of Patent: Apr. 19, 2016

(54) POLICY EVALUATION BASED UPON DYNAMIC OBSERVATION, STATIC ANALYSIS AND CODE CHANGE HISTORY

(71) Applicant: Synopsys, Inc., Mountain View, CA (US)

(72) Inventors: Marat Boshernitsan, San Francisco, CA (US); Scott McPeak, San Francisco, CA (US); Andreas Kuehlmann, Berkeley, CA (US); Roger H. Scott, Lafayette, IN (US); Andy C. Chou, San Francisco, CA (US); Kit Transue, San Francisco, CA (US)

(73) Assignee: Synopsys, Inc., Mountain View, CA (US)

( * ) Notice: Subject to any disclaimer, the term of this patent is extended or adjusted under 35 U.S.C. 154(b) by 299 days.

(21) Appl. No.: 13/844,110

(22) Filed: Mar. 15, 2013

(65) Prior Publication Data
US 2014/0096113 A1    Apr. 3, 2014

Related U.S. Application Data

(60) Provisional application No. 61/706,816, filed on Sep. 28, 2012.

(51) Int. Cl.
*G06F 9/44* (2006.01)
*G06F 11/36* (2006.01)

(52) U.S. Cl.
CPC ........ *G06F 11/3672* (2013.01); *G06F 11/3676* (2013.01)

(58) Field of Classification Search
None
See application file for complete search history.

(56) References Cited

U.S. PATENT DOCUMENTS

| | | |
|---|---|---|
| 5,335,344 A | 8/1994 | Hastings |
| 5,703,788 A | 12/1997 | Shei et al. |
| 7,340,726 B1 | 3/2008 | Chelf et al. |
| 7,480,900 B1 * | 1/2009 | Zhou et al. ............ 717/132 |
| 8,359,583 B2 | 1/2013 | Chou et al. |
| 8,495,574 B2 * | 7/2013 | Harding et al. ........ 717/124 |
| 8,516,434 B2 | 8/2013 | Mcpeak |
| 8,516,443 B2 | 8/2013 | Li et al. |
| 8,549,490 B2 | 10/2013 | Dolby et al. |
| 8,762,949 B2 | 6/2014 | Conway et al. |
| 8,806,450 B1 * | 8/2014 | Maharana et al. ...... 717/133 |

(Continued)

FOREIGN PATENT DOCUMENTS

WO    WO-2014052655 A2    4/2014

OTHER PUBLICATIONS

"International Application Serial No. PCT/US2013/062016, International Search Report mailed Apr. 9, 2014", 2 pgs.

(Continued)

*Primary Examiner* — Evral E Bodden
(74) *Attorney, Agent, or Firm* — HIPLegal LLP; Judith A. Szepesi

(57) ABSTRACT

A method is provided to evaluate tests of computer program code comprising: configuring a computer to produce, in a computer readable storage device, a code filter to indicate one or more respective portions of the computer program code to respectively either omit from or to include in a determination of adequacy of results; and comparing test results with the computer program code with the one or more respective portions filtered using the code filter to respectively either omit the respective portions from or include the respective portions in the determination as indicated by the code filter.

43 Claims, 22 Drawing Sheets

(56) References Cited

U.S. PATENT DOCUMENTS

| | | | |
|---|---|---|---|
| 8,812,276 B2* | 8/2014 | Aldrich et al. | 703/2 |
| 8,924,938 B2* | 12/2014 | Chang et al. | 717/128 |
| 8,978,009 B2* | 3/2015 | Mizrahi | 717/122 |
| 9,032,376 B2 | 5/2015 | Boshernitsan et al. | |
| 2003/0066061 A1 | 4/2003 | Wu et al. | |
| 2007/0006151 A1 | 1/2007 | Conway et al. | |
| 2007/0028217 A1* | 2/2007 | Mishra et al. | 717/124 |
| 2009/0007077 A1* | 1/2009 | Musuvathi et al. | 717/130 |
| 2009/0292956 A1* | 11/2009 | Rivera et al. | 714/48 |
| 2011/0078667 A1 | 3/2011 | Dolby et al. | |
| 2012/0151278 A1 | 6/2012 | Tsantilis | |
| 2012/0222021 A1 | 8/2012 | Zhao | |
| 2012/0304153 A1 | 11/2012 | Li et al. | |
| 2013/0031531 A1 | 1/2013 | Keynes et al. | |
| 2014/0130020 A1 | 5/2014 | Boshernitsan et al. | |

OTHER PUBLICATIONS

"International Application Serial No. PCT/US2013/062016, Written Opinion mailed Apr. 9, 2014", 13 pgs.

Anderson, Paul, "Domain-specific property checking with advanced static analysis", http://mil-embedded.com/articles/domain-specific-checking-advanced-static-analysis/, (Feb. 17, 2011), 5 pgs.

Bessey, Al, et al., "A few Billion Lines of code Later using static Analysis to find Bugs in the Real World", Communications of the ACM | Feb. 2010 | vol. 53 | No. 2, (2010), 66-75.

Chess, Brian, "Secure Programming with Static Analysis", (May 24, 2007), 56 pgs.

Engler, Dawson, et al., "Static Analysis versus Software Model Checking for bug finding", (2004), 12 pgs.

Gomes, Ivo, et al., "An overview on the Static Code Analysis approach in Software Development", 1 Software Testing and Quality, Master in Informatics and Computing Engineering, 2 Software Testing and Quality, Doctoral Program in Informatics Engineering, Faculdade de Engenharia da Universidade do Porto, Rua Dr. Roberto Frias 4200-465, Porto, Portug, (2009), 16 pgs.

Guo, Philip J., et al., "Linux Kernel Developer Responses to Static Analysis Bug Reports", (2009), 8 pgs.

Nori, Aditya V., et al., "The Yogi Project: Software Property Checking via Static Analysis and Testing", (2009), 178-181.

"U.S. Appl. No. 14/037,576, Notice of Allowance mailed Jan. 8, 2015", 24 pgs.

"U.S. Appl. No. 14/037,576, Applicant Interview Summary filed Feb. 9, 2015", 2 pgs.

"U.S. Appl. No. 14/037,576, Examiner Interview Summary Dec. 19, 2014", 1 pg.

"U.S. Appl. No. 14/037,576, Preliminary Amendment filed Dec. 23, 2014", 7 pgs.

"U.S. Appl. No. 14/708,980, Supplemental Preliminary Amendment filed Jun. 25, 2015", 21 pgs.

"International Application Serial No. PCT/US2013/062016, International Preliminary Report on Patentability mailed Mar. 31, 2015", 15 pgs.

* cited by examiner

POLICY EVALUATION BASED UPON DYNAMIC OBSERVATION, STATIC ANALYSIS AND CODE CHANGE HISTORY

CLAIM OF PRIORITY

This patent application claims the benefit of priority, under 35 U.S.C. Section 119(e), to U.S. Provisional Patent Application Ser. No. 61/706,816, filed Sep. 28, 2012, and which is hereby incorporated herein by reference in its entirety.

BACKGROUND

Workflow management of software development typically involves coordinating the development of the code with the testing of code. FIG. 1 is an illustrative drawing representing a typical software development and testing cycle 100. The development and testing of complex software code typically is an iterative process. Code 102 ordinarily is subjected to tests while it is still in development. New features are added while software bugs/errors and vulnerabilities are corrected. The development and testing cycle repeats until the code is determined to be sufficiently developed and tested.

More particularly, for example, one or more software architects 104 may contribute to a design of a system architecture that is to be implemented using computer program code. A software development team 106 develops software code features 102 to implement the architecture and also may work in concert with a test engineering team to develop tests 108 for the new code and also to test the existing code for regressions, such as unintended changes to the previously existing behavior, for example. The developers 106 and test engineers 110 ordinarily collaborate in fixing tests, fixing code (e.g., implementing new or additional intended behavior) and in fixing bugs 112 (e.g., deviations from the intended behavior). Development managers 114 manage the overall process and determine when code features are adequately developed, bugs have been sufficiently eliminated and risks are well enough understood to release the code for quality assurance 116.

Dynamic analysis and static analysis are two different techniques used in the automated testing of software code. Dynamic analysis is performed by observing the behavior of code while the code executes on a machine. Static analysis is performed on static code i.e., code that is not running during the analysis process.

Dynamic analysis evaluates runtime behavior of computer code. Instrumentation code is inserted into the code-under-test. The instrumentation code captures runtime information generated in the course of execution of the code for use in observing and evaluating the dynamic, i.e. runtime execution, behavior of the code. U.S. Pat. No. 5,335,344, invented by Hastings, discloses an example of some known software code instrumentation and dynamic analysis techniques. The execution of code during dynamic analysis is driven by tests, which are artifacts that provide input parameters to the system undergoing the analysis. Additionally, tests verify the intended behavior by comparing the output from the system under test with the expected output recorded as part of each test case.

Static analysis can be used to detect kinds of errors that are often missed when using dynamic analysis techniques alone. For example, static analysis may detect an illegal operation that is contained in a rarely traversed or otherwise hard-to-test conditional branch code path that is rarely visited during operation of the software, and that therefore, easily could go undetected during dynamic analysis. Static analysis ordinarily involves use of a variety of different static analysis programs/software tools often referred to as 'checkers' to evaluate code paths to identify different kinds of vulnerabilities and/or errors. For example, checkers can be used to detect syntax errors, functions without return values, variables that have been declared but not used, inadvisable automatic type conversions, tainted data, integer overflows, global-variable inconsistencies, problems associated with using modules (e.g., missing or invalid modules or input/export mismatches), to name just a few.

Dynamic analysis and static analysis techniques have been developed that utilize information generated during a build process to identify the code that is to be subjected to analysis. Modern software typically is developed using a modular approach. Teams of programmers may work on different modules or portions of the software. Consequently, source code, compilers, and ancillary software components often are distributed across many different directories and systems. As a result of this complexity, software developers typically use build management utilities such as the "make" program to assist in the process of building executable code.

Dynamic analysis and static analysis can take advantage of the build process by intercepting information about the code generated during a build process and using the information to identify the code to be analyzed. During a typical software development process, source code is compiled to produce an executable script in a high-level programming language, byte code that needs to be further interpreted by an interpreted program, and/or executable binary code that runs directly on the CPU. Different portions of the software may be written using different programming languages that require the use of different compilers, for example. Moreover, different compilers may be used to compile different portions of the source code, even when all of the code is written in the same language. For example, different compilers may produce executable code that runs on computer systems with different microprocessors. A 'build' process, which involves identifying the source code files associated with a program and establishing appropriate directory locations, compiler names, and other compilation settings involves many steps, and software developers typically automate such a build process using what typically is referred to as a build program. Both dynamic analysis and static analysis processes may leverage information about source code that is made available during the build process by intercepting information that identifies the code to be statically analyzed. Commonly owned U.S. Pat. No. 7,340,726 invented by Chelf et al. describes examples of some known static analysis techniques that leverage information about code made available during a build process.

Workflow management of the development and testing of software systems that may involve millions of lines of code developed at different times by different individuals is a complex challenge. Keeping code development on schedule while ensuring that the code is adequately tested requires maintaining an up to date record of what code requires testing as the code changes while it is in development. Workflow management often is especially difficult because the code development cycle is interleaved with dynamic and static testing. Keeping track throughout the development and testing cycle of what has been accomplished, what needs to be done and who needs to do what and when is an important but difficult responsibility.

SUMMARY

In one aspect, a method is provided to evaluate testing of computer program code. The method includes configuring a computer to automatically determine whether a specific portion of the code has been adequately tested.

In another aspect, a method or an article of manufacture can be provided to evaluate tests of computer program code. The method includes configuring a computer to produce a code filter to indicate one or more respective portions of the computer program code to respectively either omit from or to include in a determination of adequacy of test results. Test results are compared with the computer program code, with the one or more respective portions filtered using the code filter to respectively either omit the respective portions from or to include the respective portions in the determination as indicated by the code filter.

DESCRIPTION OF EMBODIMENTS

Figure 1:
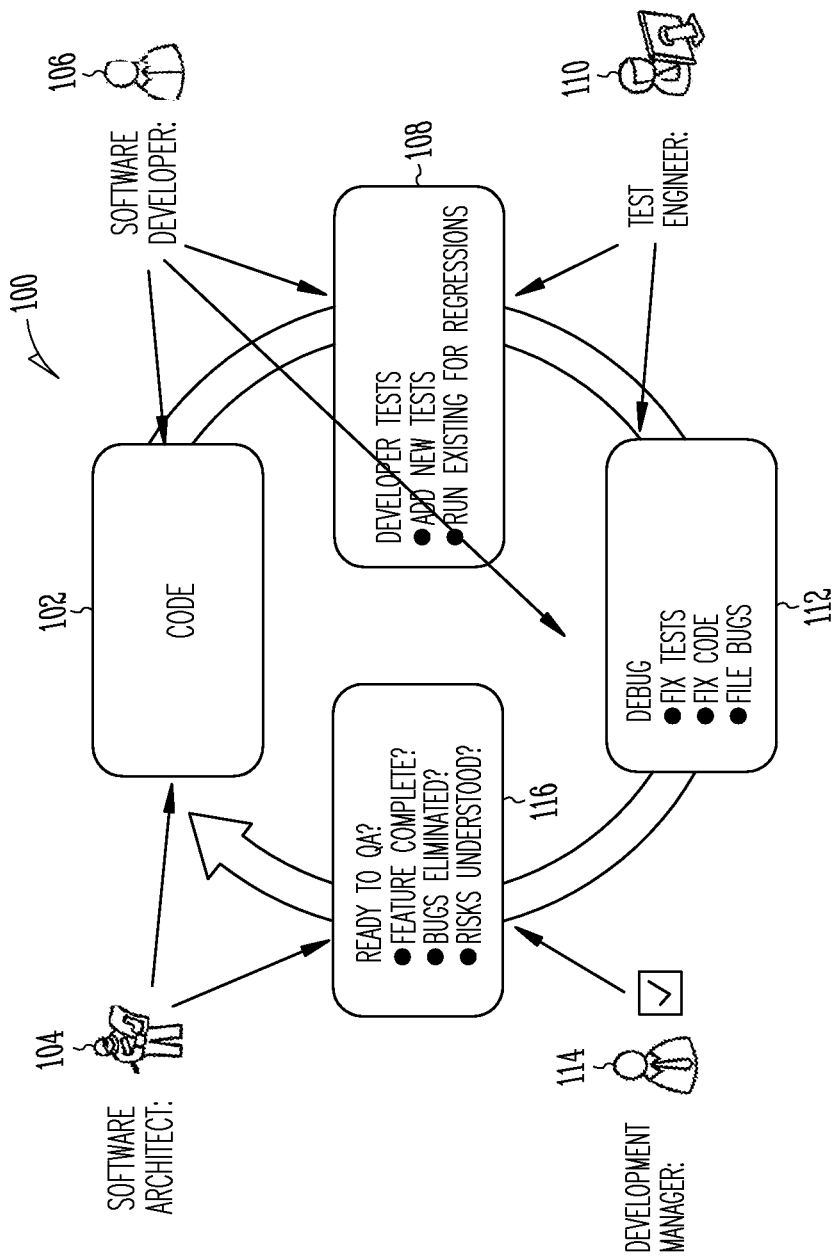
FIG. 1 is an illustrative drawing representing a typical software development and testing cycle.

The following description is presented to enable any person skilled in the art to create and use a computer system configuration and related method and article of manufacture to determine portions of computer program code that are to be tested and to use the determination as a basis to evaluate adequacy of the testing the computer program code. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known data structures and processes are shown in block diagram form in order not to obscure the description of the invention with unnecessary detail. Identical reference numerals may be used to represent different views of the same item in different drawings. Flow diagrams in drawings referenced below are used to represent processes. A computer system is configured to perform these processes. The flow diagrams include modules that represent the configuration of a computer system according to computer program code to perform the acts described with reference to these modules. Thus, the present invention is not intended to be limited to the embodiments shown, but is to be accorded the widest scope consistent with the principles and features disclosed herein.

Figure 2:
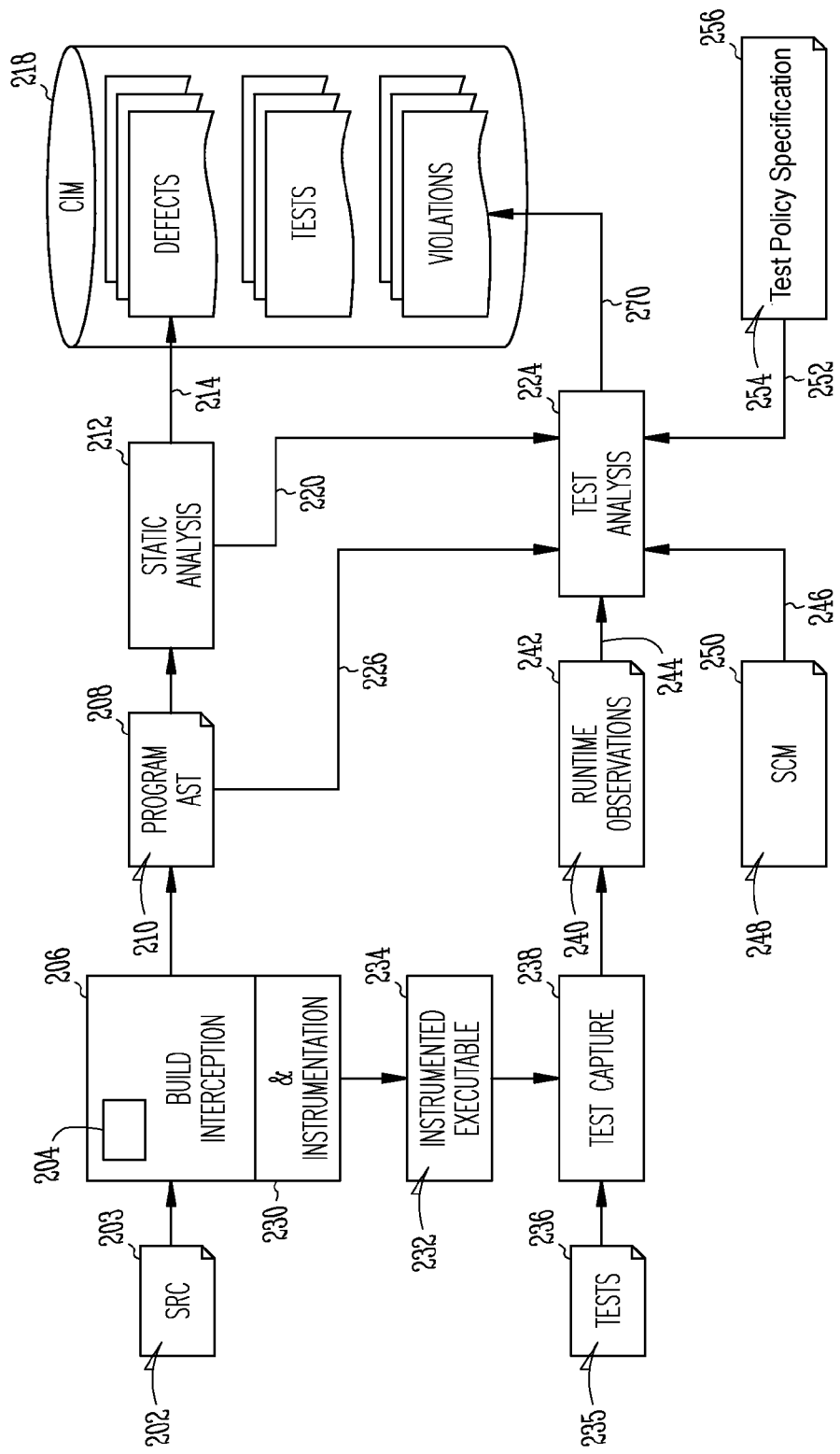
FIG. 2 is an illustrative block diagram of a system to implement observation and analysis of source-code-under-test in accordance with some embodiments.

FIG. 2 is an illustrative block diagram of a system to implement observation and analysis of source-code-under-test in accordance with some embodiments. Source-code-under-test 202 is stored in a storage device 203. A build module 204 implements a build process that identifies and accesses source code files associated with the software code 202 to be tested. It will be appreciated that the source code 202 may comprise source code files stored in disparate locations and that often a build program is used to configure a computer to locate and identify the files so that they can be tested. More particularly, in some embodiments, a build program such as a 'make' utility automatically builds executable programs and libraries from source code by reading files often called 'makefiles' which specify how to derive the target program. A build interception module 206 configures a computer to intercept the source code files through the build module 204 and captures the identified source code 202 to be tested in a storage device 208. In some embodiments, the code-under-test is transformed for representation in an abstract syntax tree (AST) structure 210 in which many specifics of formatting and identifiers are removed from the source code 202, and the remaining code is organized in a tree structure suitable for automated static analysis of the code.

A static analysis module 212 implements a static analysis software tool to perform static analysis of the source code 202 represented by the AST structure 210 stored in the storage device 208. Performing static analysis may involve configuring a computer to run a variety of checkers on the source code to produce a corresponding variety of static analysis results. A checker is a program that analyzes the static code for some specific property or characteristic. A static analysis tool typically can run a large variety of different checkers. In some embodiments, the static analysis module 212 produces first static analysis results indicated by arrow 214 that identify defects and/or vulnerabilities in the source-code-under-test 202, which is represented by the AST structure 210. Indications of the defects and/or vulnerabilities, such as the kinds of defects and their locations in the source code 202, are stored in storage in a storage device 218. The static analysis module 212 produces second static analysis results indicated by arrow 220 useful to identify semantically-significant code behaviors, such as abnormal program termination, logically non-executable code and more. A source control management (SCM) module 250 comprises a database stored in a computer readable storage device that includes computer program source code and metadata information about modifications to the software, such as the kinds of changes (e.g., additions and/or subtractions of code), time frames in which changes were made, authors of the changes and locations of the changes in the source code 202. The SCM module 248 is coupled to provide the source code and associated metadata about the source modification history to a test analysis module 224, which is described more fully below.

An instrumentation module 230 configures a computer to compile and instrument the source code 202 that is intercepted by the build intercept module 206 and provides the instrumented executable code 232 for storage in a storage device 234. Dynamic (runtime) test code 235 is stored in a storage device 236. A test capture module 238 configures a computer to run the instrumented executable code 232 and to run the test code 235 to perform runtime tests on the instrumented code 232 to observe runtime behavior of the instrumented code 232, and to provide runtime observations 240 for storage in a storage device 242.

The test analysis module 224 configures a computer to evaluate sufficiency of testing of source-code-under-test 202 as a function of a source code modification history 246 and static analysis test results 220 specified in the test policy specification 254. The test analysis module 224 configures a computer as indicated by arrow 252 to access the test policy specification 254 stored in a storage device 256 that indicates the desired test coverage. As explained more fully below, in some embodiments the test policy specification 254 specifies the desired test coverage in terms of code history parameters and static analysis directives that indicate code portions to be excluded from test coverage and that indicate code portions to be included within test coverage. The test analysis module 224, further configures a computer, as indicated by arrow 220, to access the second static analysis results 220. The test analysis module 224 further configures a computer as indicated by arrow 226 to access the source code represented as an AST 210. The test analysis module 224 further configures a computer, as indicated by arrow 244, to access contents of the runtime observations 240. The test analysis module 224 further configures a computer, as indicated by arrow 246, to access contents of the source code modification history 248 stored in a storage device 250. The test analysis module 224 further configures a computer to produce output information indicated by arrow 270 that provides an indication of whether the dynamic observations meet test coverage requirements specified in the specification.

Figure 3:
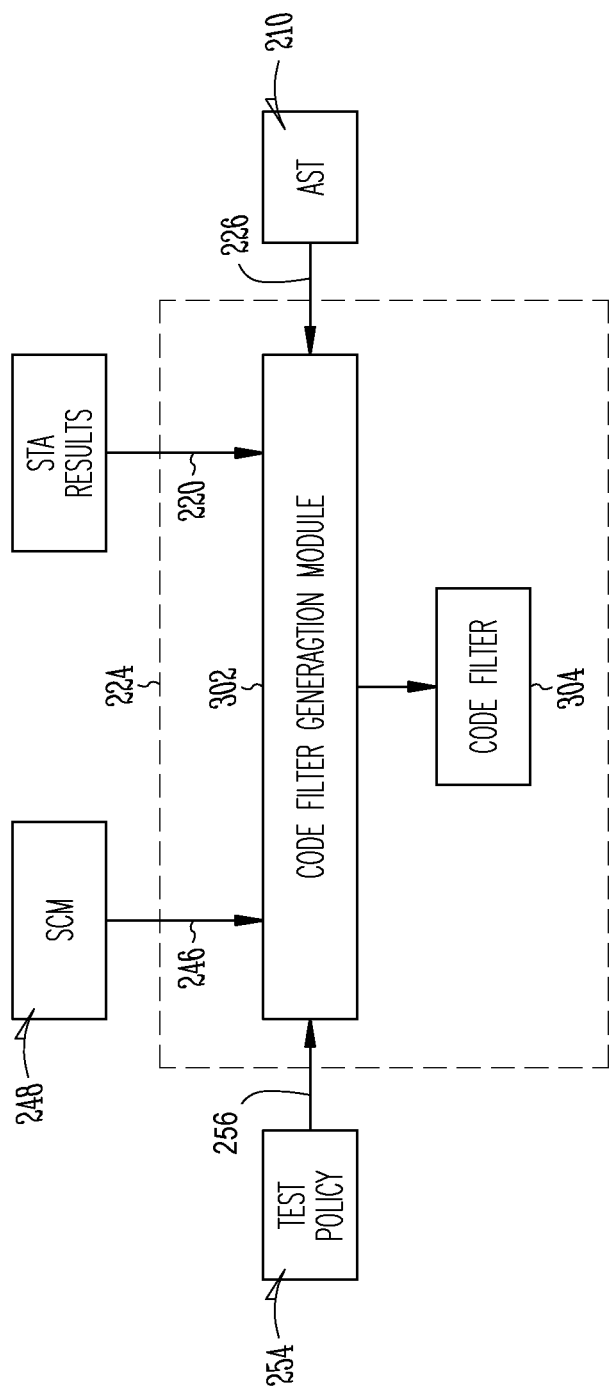
FIG. 3 is an illustrative diagram representing a code filter generation module to generate a code filter structure, which is stored in a computer readable storage device in accordance with some embodiments.

FIG. 3 is an illustrative diagram representing a code filter generation module 302 to generate a code filter structure 304, which is stored in a computer readable storage device (not shown), in accordance with some embodiments. The module 302 is a constituent of the test analysis module 224, which is indicated by dashed lines labeled 224. The code filter generation module 302 receives as input a test policy 254 as indicated by arrow 252, SCM information 248, as indicated by arrow 246, static analysis (STA) results as indicated by arrow 220, and an abstract syntax tree (AST) 210 as indicated by arrow 226 that represents the computer program code-under-test. The code filter generation module 302 generates the code filter information structure 304 in response to the received inputs. The code filter information structure 304 is a dynamically generated constituent of the test analysis module 224.

Figure 4A:
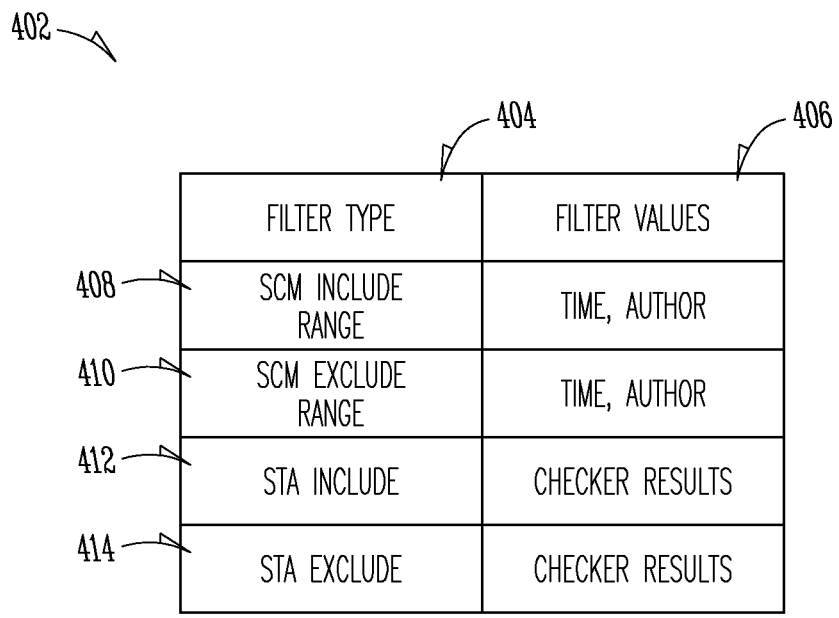
FIG. 4A is an illustrative drawing representing a first user interface display for use in entering information in a test policy specification that includes code filter related information for use by the code filter generation module to generate the code filter in accordance with some embodiments.
Figure 4B:
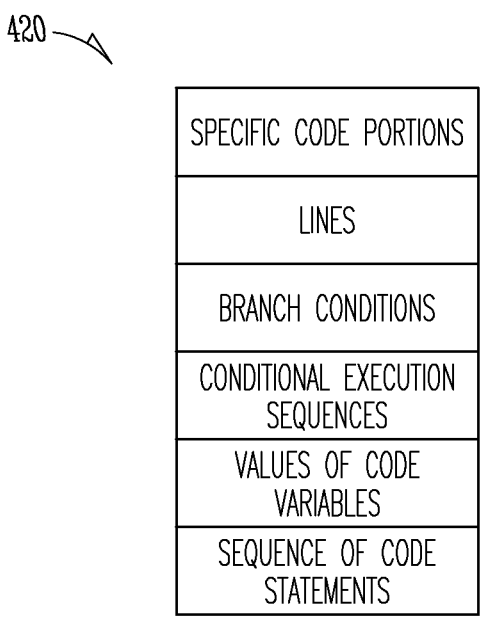
FIG. 4B is an illustrative drawing representing a second user interface display for use in entering information in a test policy specification that includes specific code portion information for use in evaluating adequacy of evaluation of code under-test as represented by the runtime observations in accordance with some embodiments.

FIGS. 4A-4B are illustrative drawings representing information entered in the test policy specification 254 via a user interface display generated on a computer screen display for input to the test analysis module 224, and more particularly, to the code filter generation module 302 within the test analysis module 224 in accordance with some embodiments. FIG. 4A is an illustrative drawing representing a first user interface display 402 for use in entering information in a test policy specification 254 that includes code filter related information for use by the code filter generation module 302 to generate the code filter 304 in accordance with some embodiments. The illustrative first user interface display 402 comprises a plurality of fields arranged in a matrix of rows and columns. A first column 404 contains filter type fields that identify different filter types and a second column 406 contains filter value fields that indicate user-selected values for the different filter types. A first row 408 contains an SCM Include Range field 406 and a corresponding user-selected value to indicate a range of time and/or authors to be used to identify portions of the code-under-test to be included in evaluation of the runtime observations 240. A second row 410 contains an SCM Exclude Range field and a corresponding user-selected value to indicate a range of time and/or authors to be used to identify portions of the code-under-test to be excluded from evaluation of the runtime observations 240. A third row 412 contains an STA Include field and a corresponding user-selected value to indicate a STA results to be used to identify portions of the code-under-test to be included in evaluation of the runtime observations 240. A third row 414 contains an STA Exclude field and a corresponding user-selected value to indicate a STA results to be used to identify portions of the code under test to be exclude in evaluation of the runtime observations 240. Thus, it will be appreciated that in accordance with some embodiments, a user interface screen display is generated that that a user may use to indicate general portions of the code-under-test that are of interest for evaluation. In some embodiments, the user interface includes an input whereby a user may provide an indication as to which filter ought to take precedence in the event of a conflict between the filters, e.g., in the event that one filter indicates that certain code should be omitted but another filter indicates that that same code should be included.

FIG. 4B is an illustrative drawing representing a second user interface display 420 for use in entering information in a test policy specification 254 containing specific code portion information for use in evaluating adequacy of evaluation of code under-test as represented by the runtime observations 240 in accordance with some embodiments. The computer program code under test has different constituent portions, and different individual code folters can be specified for these different code portions. Different portions can be tested using different tests, and the different code filters can be used to zero in on specific code portions to determine whether testing has been adequate as to those specific code portions. The second user interface display 420 can be used to designate the specific portions of the code-under-test to be evaluated for adequacy of testing based upon the runtime observations 240. For example, in some embodiments, a user can enter information in the second user interface display 240 to indicate specific code portions to be tested such as: of lines of code; files, functions, branch conditions; conditional branch execution sequences; values of code variables; and sequence of code statements. Also, for example, specific portions to be tested may include branches within lines, branches within files, and lines within files. Moreover, specific code portions may include syntax constraints and code constraints, for example. The specific portions are contained in the AST 210, which is provided as an input to the test analysis module 224. Moreover, the specific code portion may include a range of one or more values that are to be tested for variables in the code. In accordance with some embodiments, in response to a user designating specific code portions to be included in or omitted from testing, corresponding code filters are created and stored in a computer readable storage device (not shown) for use in filtering the code of the AST 210 accordingly. Thus, specific code filters may be created to filter the code in the AST 210 based upon lines of code; files, functions, branch conditions; conditional branch execution sequences; values of code variables; and sequence of code statements for example. Therefore, it will be appreciated that in accordance with some embodiments, a user interface screen display is generated that that a user may use to indicate specific portions of the code-under-test that are of interest for evaluation.

Figure 5:
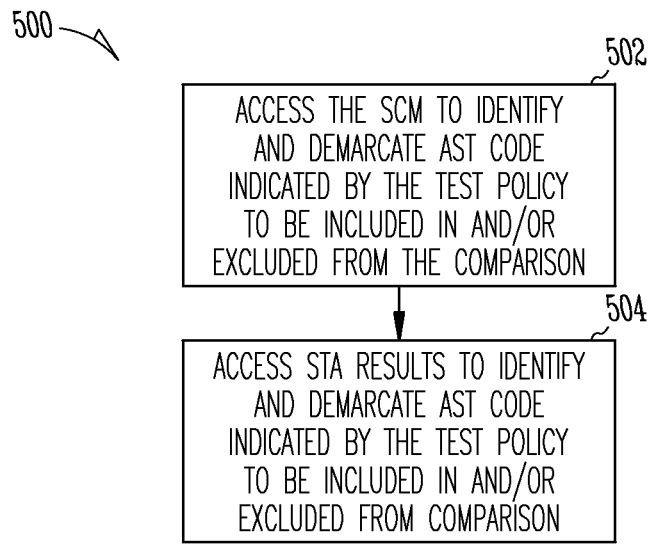
FIG. 5 is an illustrative flow diagram representing details of a process performed using a computer configured to implement the code filter generation module of FIG. 3 in accordance with some embodiments.

FIG. 5 is an illustrative flow diagram representing details of a process 500 performed using a computer configured to implement the code filter generation module 302 of FIG. 3 in accordance with some embodiments. Module 502 configures a computer to use user-provided values associated with the SCM Include Range and/or SCM Exclude Range information within a test policy specification 254, specified using the first user interface display 402, in conjunction with the SCM 248, to identify and demarcate code as a function of time and/or author to include and/or omit from an evaluation of adequacy of testing indicated by the runtime observations 240. Stated differently, the SCM 248 correlates modifications (including creations, additions, deletions) of code within the code-under-test (which is represented by the AST 210) with the times and authors of those modifications. The user-provided SCM Include Range and/or SCM Exclude Range indicates times and/or authors of code modification to be used (or not used) in evaluating adequacy of the testing. The module 502 uses the user-provided time/author information in conjunction with the SCM 248 to identify code in the code-under-test to be used (or not used) to evaluate the adequacy of the testing indicated by the runtime observations 240.

Module 504 configures a computer to use user-provided values associated with the STA Include and/or STA Exclude information within a test policy specification 254, specified using the first user interface display 402, in conjunction with the results generated by one or more checkers of the static analysis (STA) tool 212, to identify and demarcate code to include in and/or omit from an evaluation of adequacy of testing indicated by the runtime observations 240. Stated differently, the STA tool 212 can identify and demarcate code from the code-under-test that should be excluded from testing even if it falls within a user-specified time and/or author range and can identify and demarcate code from the code-under-test for that should be included within testing even if it falls outside a user-specified time and/or author range.

Figure 6:
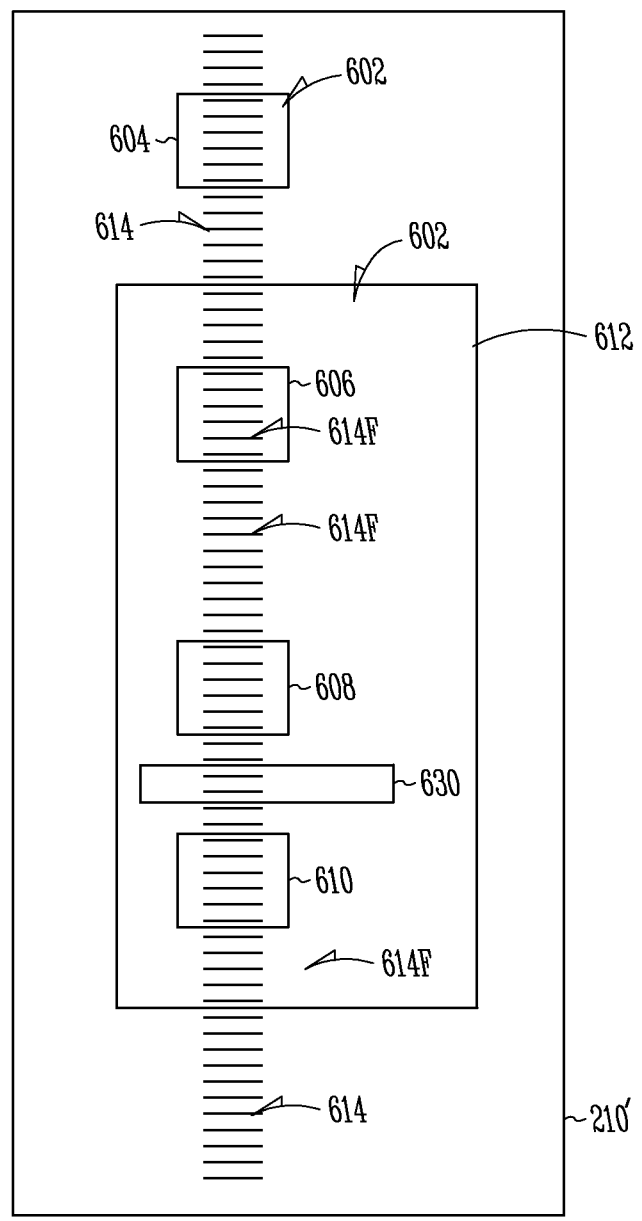
FIG. 6 is an illustrative drawing representing a code filter structure generated in accordance with the process of FIG. 5 and stored in a computer readable device in accordance with some embodiments.

FIG. 6 is an illustrative drawing representing a code filter structure generated in accordance with the process of FIG. 5 and stored in a computer readable device in accordance with some embodiments. The code filter structure 602 is associated in the storage with the AST 210, which corresponds to and represents the code-under-test, so as to define a filtered AST 210'. The term 'filtered AST' as used herein, refers to the AST 210 with the code filter structure 602 associated with it in storage. More specifically, the illustrative code filter structure 602 includes one or more example static analysis (STA) filter elements 604-610. The illustrative code filter structure 602 also includes one or more example source control management (SCM) filter elements 612 (only one shown). The illustrative code filter structure 602 also includes one or more example specific code portion filter elements 630 (only one shown). More particularly, each respective STA filter element 604-610 is associated with a respective portion (referred to herein as a 'filtered portion') of the code within the AST 210 that is to be either included in or excluded from a determination of adequacy of the dynamic test results represented by the runtime observations 242. Similarly, each of the one or more SCM filter elements 612 (only one shown) is associated with a respective portion (referred to herein as a 'filtered portion') of the code within the AST 210 that is to be either included in or excluded from a determination of adequacy of the dynamic test results represented by the runtime observations 242. Likewise, each of the one or more code portion filter elements 612 (only one shown) is associated with a respective specific code portion (referred to herein as a 'filtered portion') of the code within the AST 210 that is to be either included in or excluded from a determination of adequacy of the dynamic test results represented by the runtime observations 242.

It will be appreciated that in some instances an STA filter element, an SCM filter element and a specific code portion filter element may be associated in whole or in part with the same code within the AST 210. In accordance with some embodiments, when both an STA filter element and an SCM filter element overlap and are associated in whole or in part with the same code within the AST 210, the STA filter element takes precedence. As explained more fully below, in practice that means that when an STA filter element and an SCM filter element are associated with the same code of the AST 210, a filter operation corresponding to the STA element with respect to the overlapped code takes precedence over a filter operation corresponding to an SCM filter element with respect to the overlapped code.

Still referring to FIG. 6, the filtered AST 210' includes many lines of code 614, 614F. Some of these lines are associated with the code filter structure 602 and some are not. In the illustrative example of FIG. 6, code that is filtered by either an STA filter element or an SCM filter element or a specific code portion filter element is labeled as 614F, and code that is not filtered by either an STA filter element or an SCM filter is labeled 614. More specifically, code that is associated with one of the STA filter elements is shown in FIG. 6 as being enclosed within one of the boxes labeled 604-610; code that is associated the SCM filter element 612 is shown in FIG. 6 as being enclosed within the box labeled 612; and code that is associated with a specific code portion filter is shown enclosed within box a labeled 630. Note that the same code may be impacted by more than one filter, and rules may be applied to define precedence among filters or to declare an error when two or more filters indicate competing filtering actions. In this illustrative example, the code associated with STA filter elements 606-610 also is associated with the SCM filter element 612. Thus, code labeled 614F is 'filtered', and code labeled 614 is not 'filtered.

Figure 7:
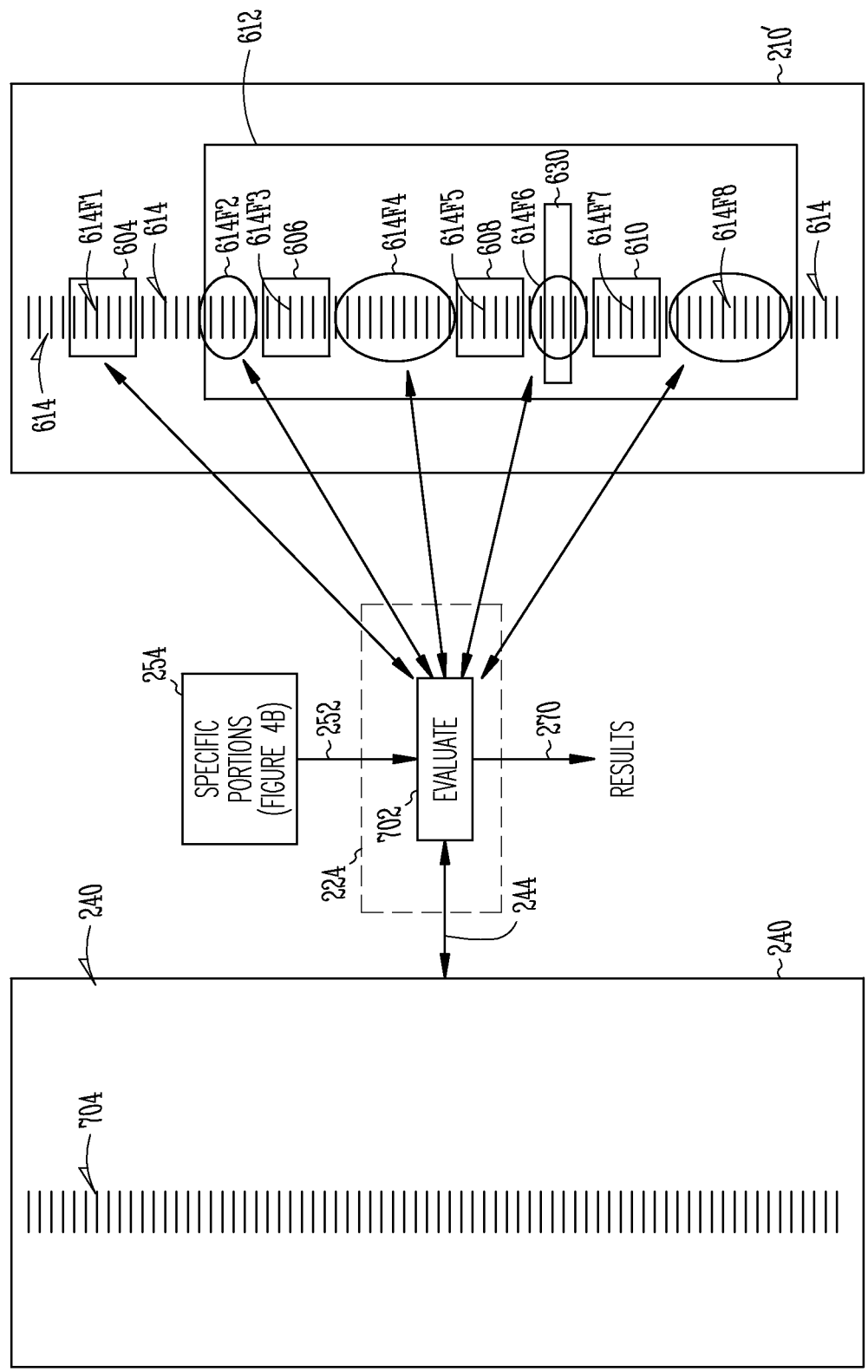
FIG. 7 is an illustrative diagram representing operation of an evaluate module to evaluate the code of the example filtered AST of FIG. 6 in accordance with some embodiments.

FIG. 7 is an illustrative diagram representing operation of an evaluate module 702 to evaluate the code of the example filtered AST 210' of FIG. 6 in accordance with some embodiments. The evaluate module 702 is a constituent of the test analysis module 224, which is indicated by dashed lines labeled 224. Further, assume in this example that the test policy 254 includes user-indicated specific portions of the AST 210 that ought to be tested in order for the testing to be adequate.

Figure 8:
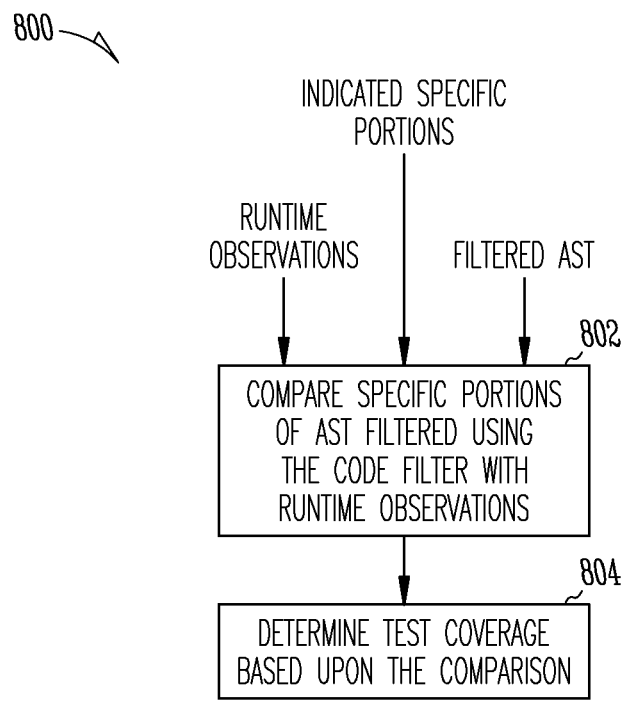
FIG. 8 is an illustrative flow diagram representing details of a process performed using a computer configured to implement the evaluate module of FIG. 7 in accordance with some embodiments.

FIG. 8 is an illustrative flow diagram representing details of a process 800 performed using a computer configured to implement the evaluate module 702 of FIG. 7 in accordance with some embodiments. Module 802 configures a computer to receive as input the runtime observations 240, the filtered AST 210' and input from the test policy 254 indicating specific portions of the code-under-test that ought to be evaluated. Module 802 configures a computer to compare specific code portions of the filtered AST 210' with the runtime observations 240. Module 804 configures a computer to determine test age based upon the comparison.

Referring again to FIG. 7 and also to FIG. 8, assume in this example, that STA filter 604 is an 'include' filter and that STA filter elements 606-610 are 'exclude' filter elements. Also, assume in this example that SCM filter 612 is an 'include' filter element. Also, assume that the runtime observations 240 include text lines 704. Thus, filtered code 614F1 associated with STA filter element 604 is designated by filter element 604 as included in tests. Since in this example, STA filter elements take precedence over SCM filter elements, filtered code 614F3, 614F5 and 614F7 associated respectively with STA filter elements 606, 608 and 610 are designated by those STA filter elements as excluded from tests. Finally, filtered code 614F2, 614F4, 614F6 and 614F8 are designated by SCM filter element 612 as included in testing. Unfiltered code 614 is not included in the tests.

In accordance with the process 800 of FIG. 8, the evaluate module 702 of FIG. 7, receives from the test policy 254 indications of specific portions of the code of the filtered AST 210' that is included in tests that ought to be indicated in the runtime results 240 as having been tested. For example, the specific portions indicated may indicate particular lines of code from the code-under-test, and in response, the module 702/804 determines whether the text 704 within the runtime results 240 indicates that the particular lines of code have been tested adequately. The specific portions indicated may indicate specific branches conditional execution of code from the code-under-test, and in response, the module 702/804 determines whether the text 704 within the runtime results 240 indicates that the particular specific branches conditional execution have been tested adequately. The specific portions indicated may indicate specific conditional execution sequences of code from the code-under-test, and in response, the module 702/804 determines whether the text 704 within the runtime results 240 indicates that the particular specific conditional execution sequences have been tested adequately. The specific portions indicated may indicate specific values of code variables of code from the code-under-test, and in response, the module 702/804 determines whether the text 704 within the runtime results 240 indicates that the particular values of code variables of code statements have been tested adequately. The specific portions indicated may indicate specific sequence of code statements of code from the code-under-test, and in response, the module 702/804 determines whether the text 704 within the runtime results 240 indicates that the particular specific sequence of code statements have been tested adequately.

EXAMPLES

Examples—Source Control Management (SCM) Repository

Figure 9:
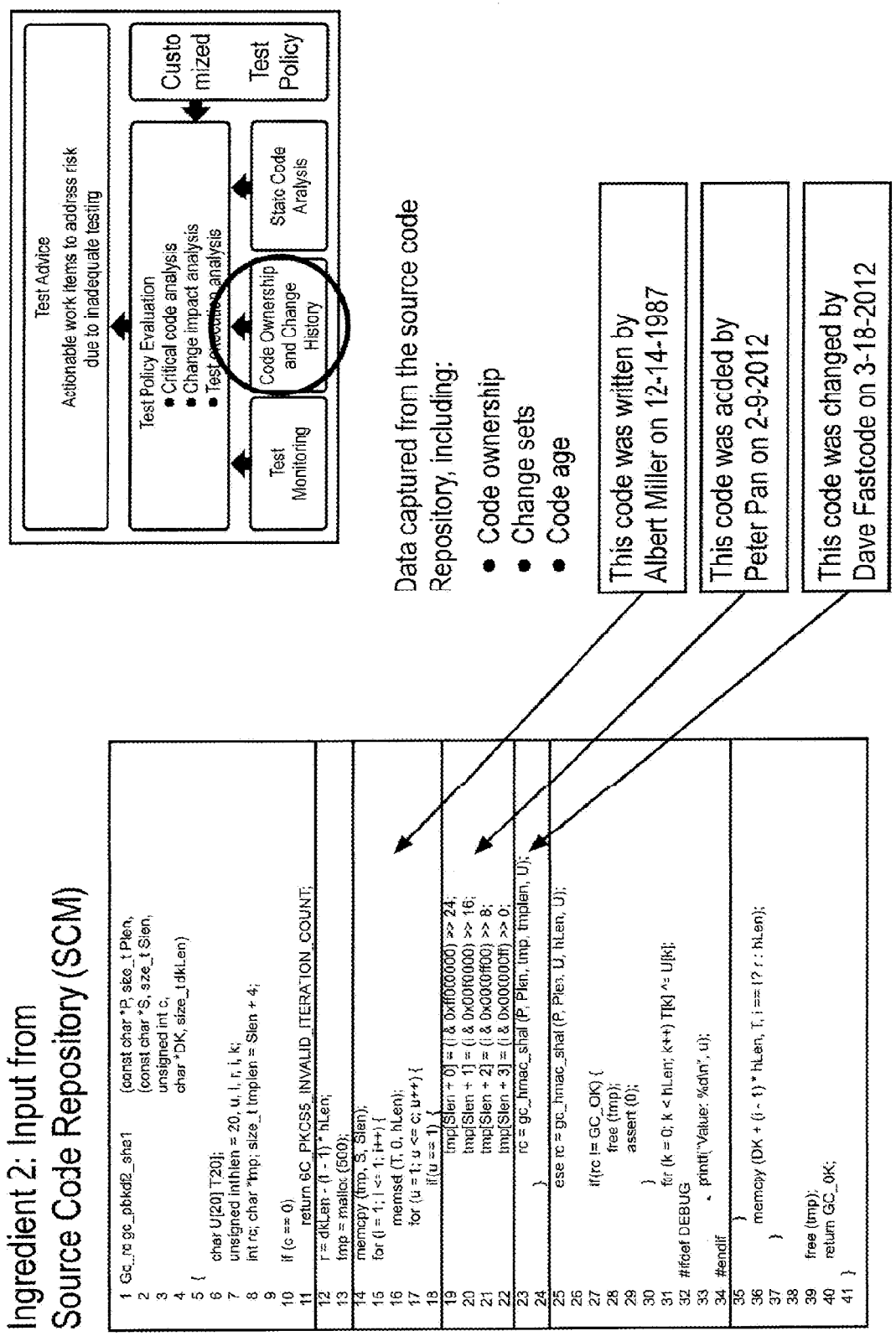
FIG. 9 is illustrative drawing showing example source code from within the SCM of FIG. 2 that is annotated with information concerning its provenance.

FIG. 9 is illustrative drawing showing example source code from within the SCM 248 of FIG. 2 that is annotated with information concerning its provenance. The metadata in the form of annotations that indicate code ownership (e.g., originally written by 'Albert Miller'), change sets (e.g., additions by 'Peter Pan' and changed by 'Dave Fastcode') and code age (e.g., see dates). The SCM provides both the code and historical information about code development that can be used to specify what code is to be tested.

For example, test policy specification 254 can be created to indicate that all code created in a time range defined as after Jul. 15, 2012 is to be tested. Alternatively, for example, in some embodiments a test policy specification 254 can be created to indicate a second history parameter that specifies a code range that includes code generated by Dave Fastcode between Mar. 15, 2012 and Aug. 15, 2012 is to be tested. Thus, the SCM 248 includes metadata about the code (e.g., authors and dates) that can be used to create one or more SCM filter elements to indicate what portion of the code is to be tested and/or what portion is to not be tested.

Examples—Dynamic Analysis

Figure 10A:
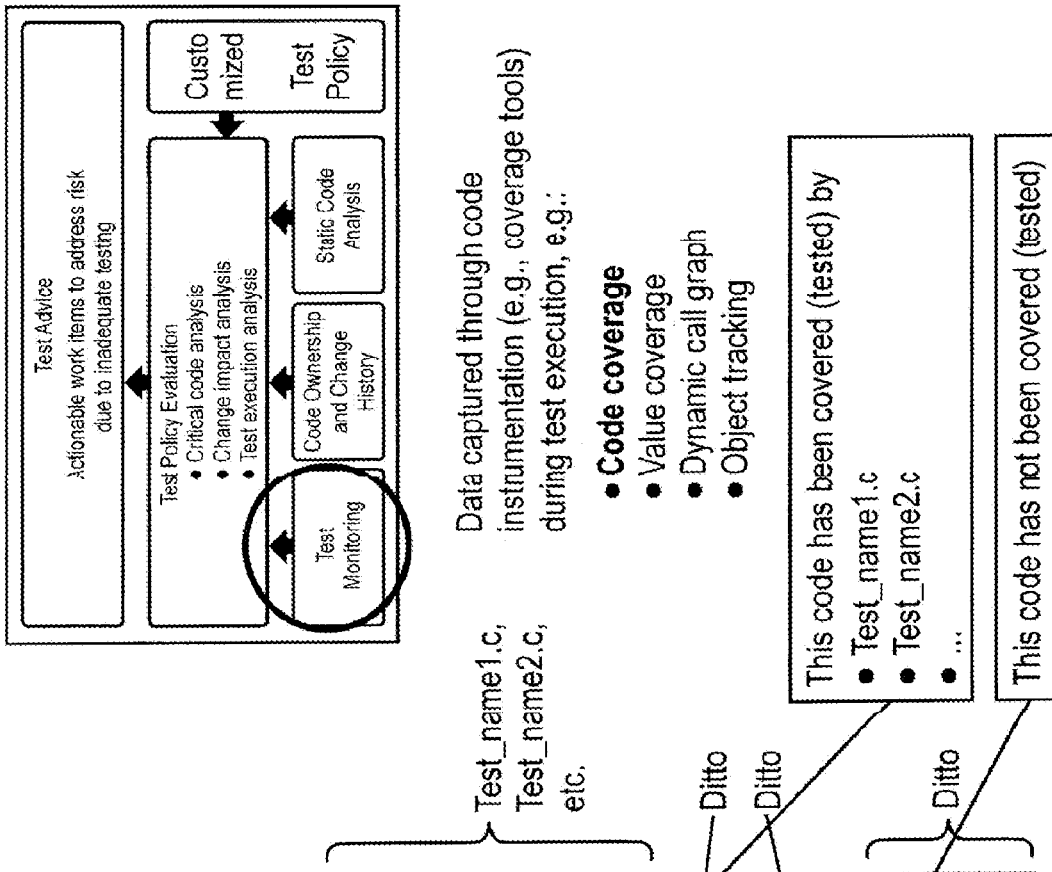
FIGS. 10A-10D are illustrative drawings showing the example source code annotated to indicate information generated by the test capture module and stored in the dynamic runtime observations module of FIG. 2.
Figure 10B:
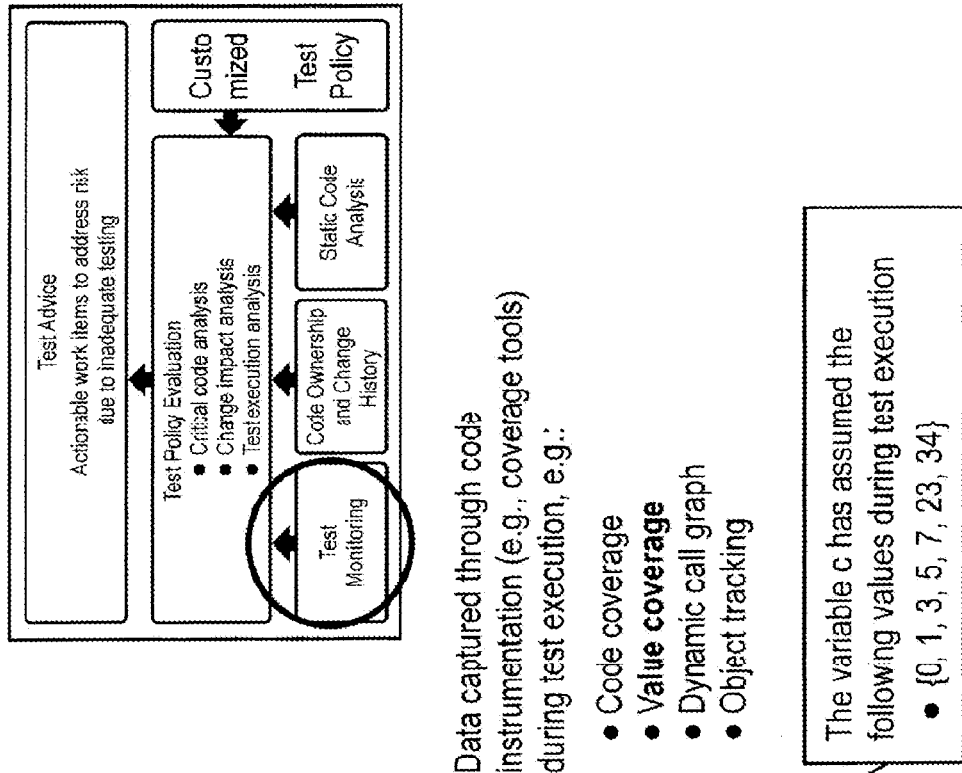
Figure 10C:
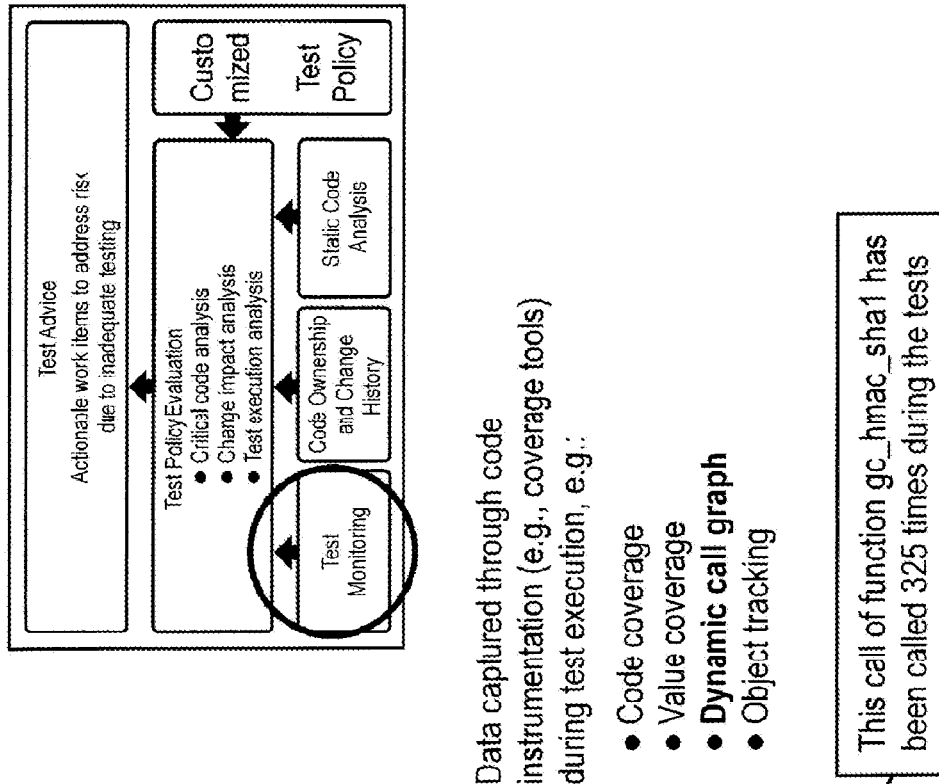
Figure 10D:
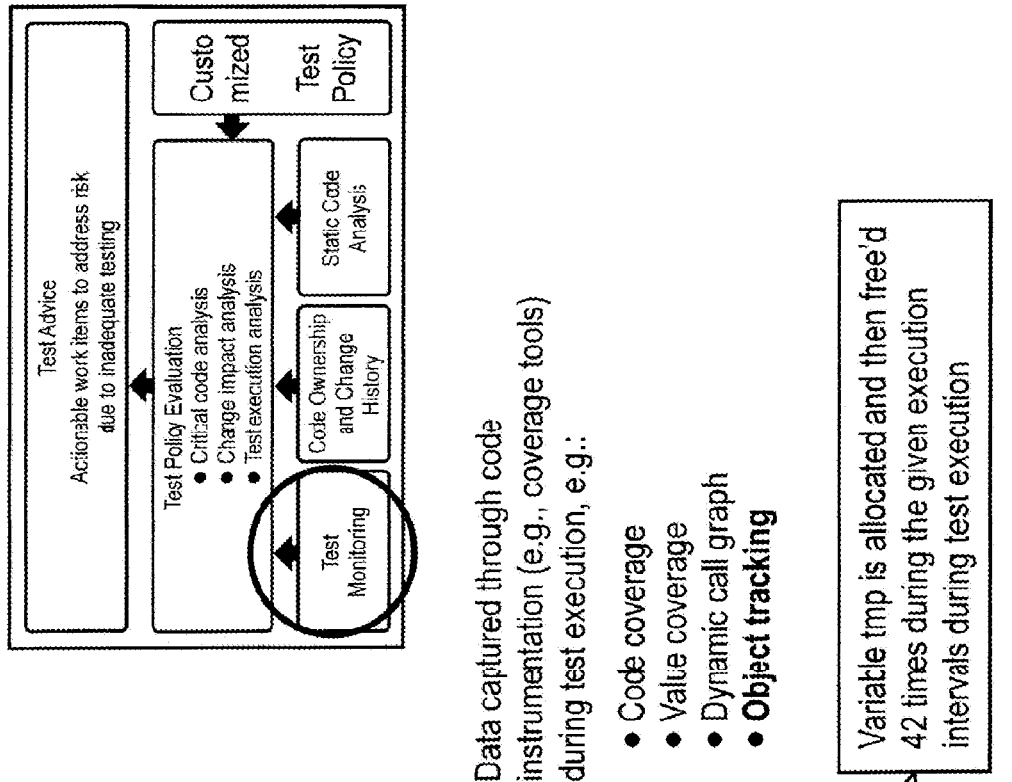

FIGS. 10A-10D are illustrative drawings showing the example source code annotated to indicate information generated by the test capture module 238 and stored in the runtime observations module 240 of FIG. 2. The instrumentation of the code enables the capture module 238 to monitor test execution while the code is running to observe what tests are being performed on which portions of code. FIG. 10A illustrates an example of monitoring of overall test coverage. FIGS. 10B-10D illustrate specific examples of particular tests.

FIG. 10A is an illustrative drawing of the example code with annotations to indicate portions of the code that have been tested using each of Test_name1.c, Test_name2.c, etc. As explained above, module 230 instruments the code. The instrumentation of the code is used to monitor code coverage of Test_name1.c, Test_name2.c, etc. Portions of the example code that are not annotated to indicate that these tests have been performed have not been tested using these tests. In this example, test capture module 238 causes an indication to be stored in the runtime observations module 240 that the following specific portions of the code-under-test have been tested: lines 10-24, 27, 30-31 and 35-41. Moreover, the runtime observations indicate that these specific portions were tested using tests Test_name1.c, Test_name2.c, etc.

FIG. 10B is an illustrative drawing of the example code with annotations to indicate that a particular variable has assumed certain values in the course of dynamic testing. In this example, module 230 instruments the example code to observe values assigned to variable "c" during testing. The test capture module 238 causes values that have been assigned to variable "c" during testing of the code to be stored in the runtime observations module 240 In this example, test capture module 238 causes an indication to be stored in the runtime observations module 240 that the following specific portion of the code-under-test have been tested: variable "c" has assumed the values {0, 1, 3, 5, 7, 23, 34}.

FIG. 10C is an illustrative drawing of the example code with annotations to indicate that a particular call function has been called some number of times in the course of testing. In this example, the module 230 instruments the example code to observe the number of times the subroutine gc_hmac_sha1 is called during testing. In this example, the test capture module 238 causes an indication that the subroutine has been stored 325 times to be stored in the runtime observations module 240. In this example, test capture module 238 causes an indication to be stored in the runtime observations module 240 that the following specific portion of the code-under-test have been tested: call of function gc_hmac_sha 1 has been called 325 times during the tests.

FIG. 10D is an illustrative drawing of the example code with annotations to indicate that a particular object has been allocated and then freed up some number of times in the course of testing. In this example, the module 230 instruments the example code to observe the number of times the object tmp is allocated and then freed during testing. It will be appreciated, for example, that an object may be allocated and freed in memory on a heap or in a stack, for example. In this example, the test capture module 238 causes an indication that the object has been allocated and freed 42 times to be stored in the runtime observations module 240. In this example, test capture module 238 causes an indication to be stored in the runtime observations module 240 that the following specific portion of the code-under-test have been tested: variable tmp is allocated and then freed 42 times during the given execution intervals during test execution.

Examples—Static Analysis

FIGS. 11A-11F are illustrative drawings showing the example source code annotated to indicate checker tests performed by the static analysis module 212 of FIG. 2 in accordance with some embodiments. Static analysis results 220 generated by the static analysis module 212 can be used to generate one or more of the STA filter elements 604-610 of FIG. 6, for example. filters 314-314-5. For example, static analysis results may provide information that indicates which code is untestable or not worthy of testing, and therefore, ought to be omitted from the test coverage. Conversely, static analysis results also may provide information that indicates additional code that ought to be tested, and therefore, ought to be included in the testing efforts.

Figure 11A:
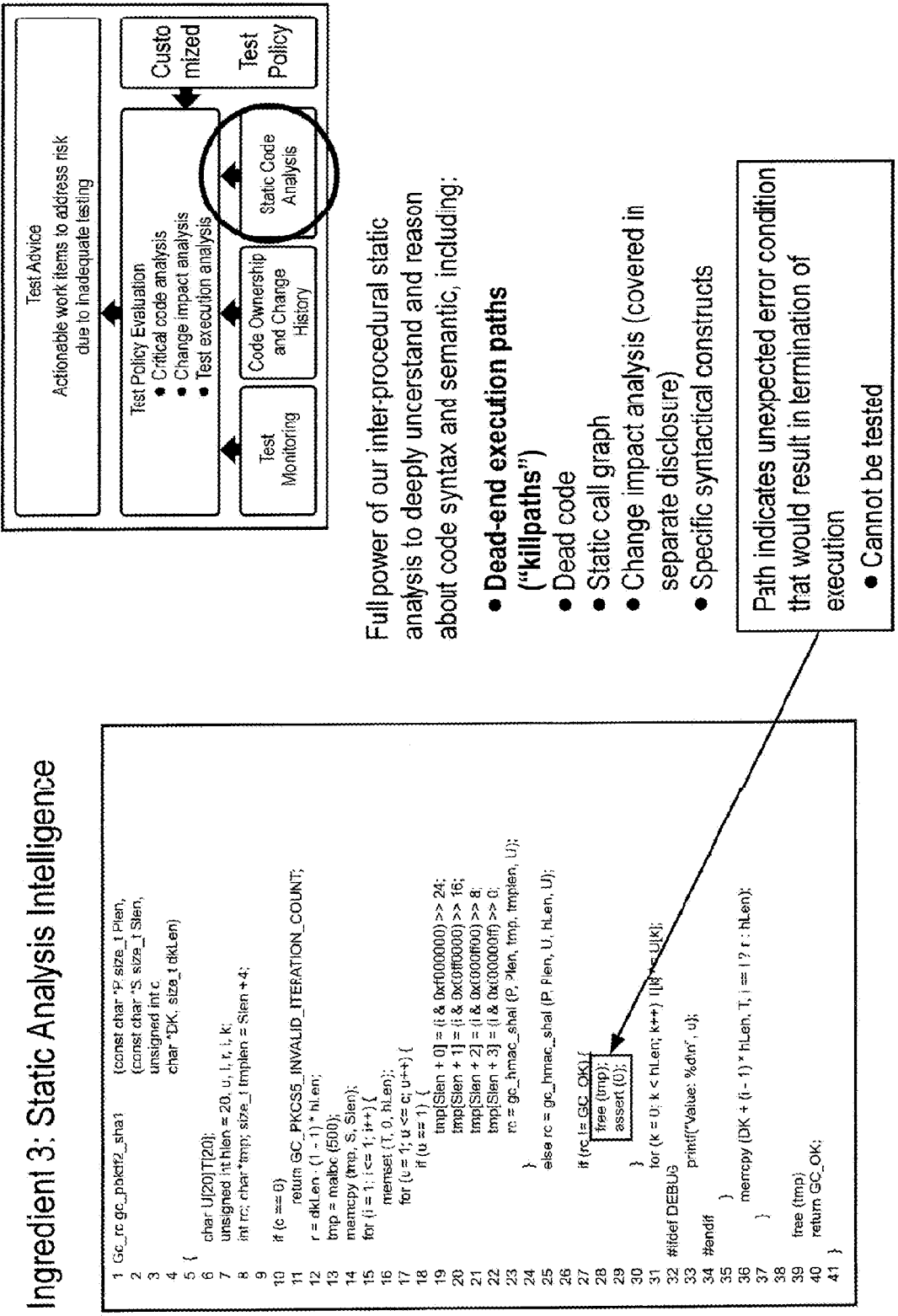
FIGS. 11A-11F are illustrative drawings showing the example source code annotated to indicate checker tests performed by the static analysis module of FIGS. 2-3 in accordance with some embodiments.

FIG. 11A is an illustrative drawing of the example code with annotations to indicate that a particular code path indicates an error condition that would result in termination of execution. Code having this kind of effect on execution of a program often is referred to as being a 'dead-end execution path' or a 'killpath'. In this particular example, assume that the specification 254 is used to communicate a directive to the static analysis module 212 directing it to use a static analysis tool checker program that identifies a killpath that includes the example code, assert (0). In accordance with some embodiments, the code that includes assert (0) and that is identified to be dead end code is communicated to the test analysis module 224, and code filter generation module 302, generates a STA filter element (e.g., one of the filters 606 to 610) to omit (i.e. filter out) or include (filter in) that code from testing or include (i.e. filter in) that code to testing.

Figure 11B:
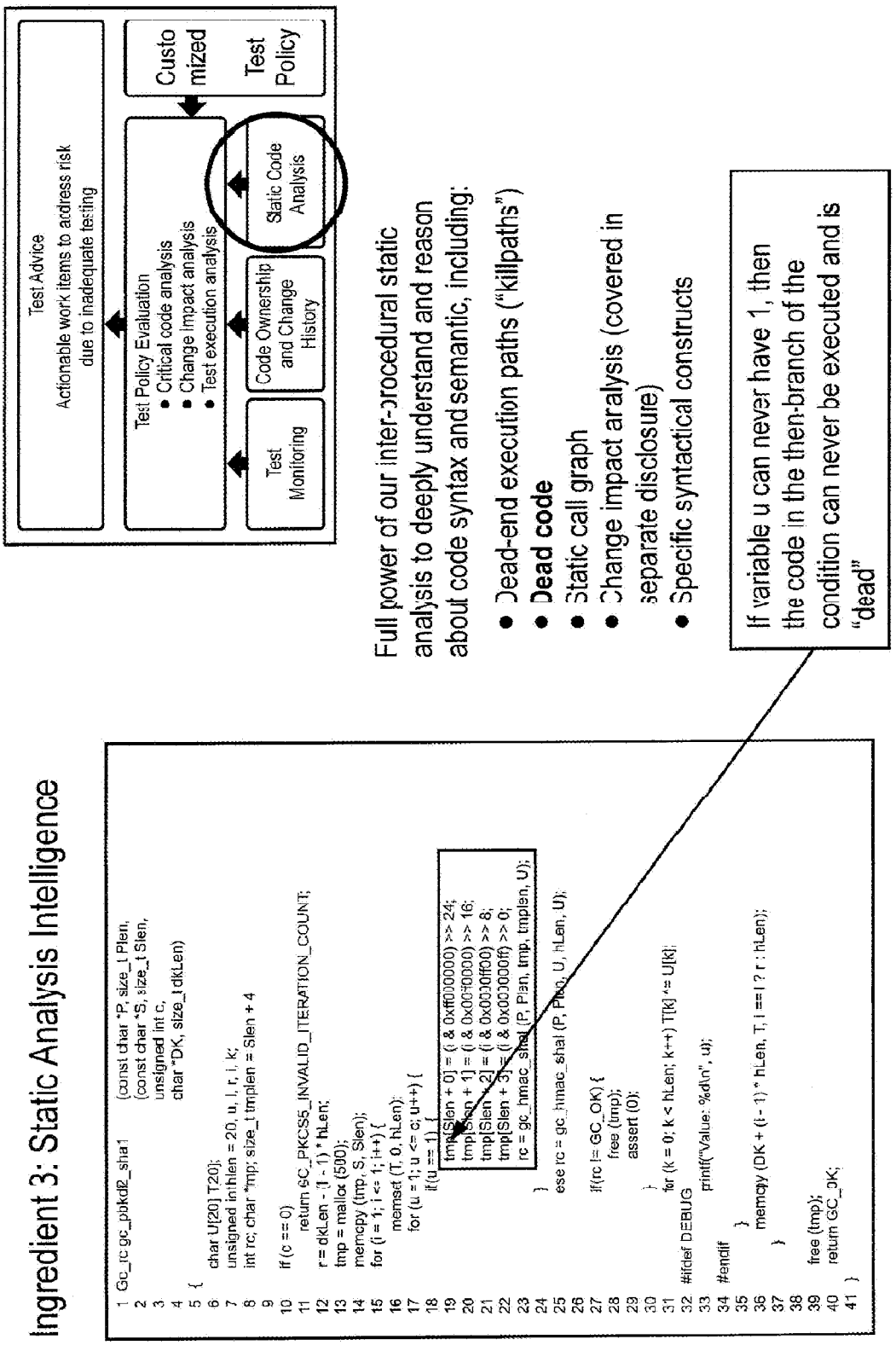

FIG. 11B is an illustrative drawing of the example code with annotations to indicate that particular code that is 'dead code'. In this example, assume that the specification 254 is used to communicate a directive to the static analysis module 212 use a checker program that determines that if the variable "u" in the example code can never have value "1", then the code in the then-branch condition can never be executed, and therefore, it is dead code. In other words, code dependent upon "u" having the value "1" can never execute, and therefore, that code is dead code. In accordance with some embodiments, the code determined to include the dead end code is communicated to the test analysis module 224, and code filter generation module 302, generates a STA filter element (e.g., one of the filters 606 to 610) so as to omit that code from testing or to include that code in testing.

Figure 11C:
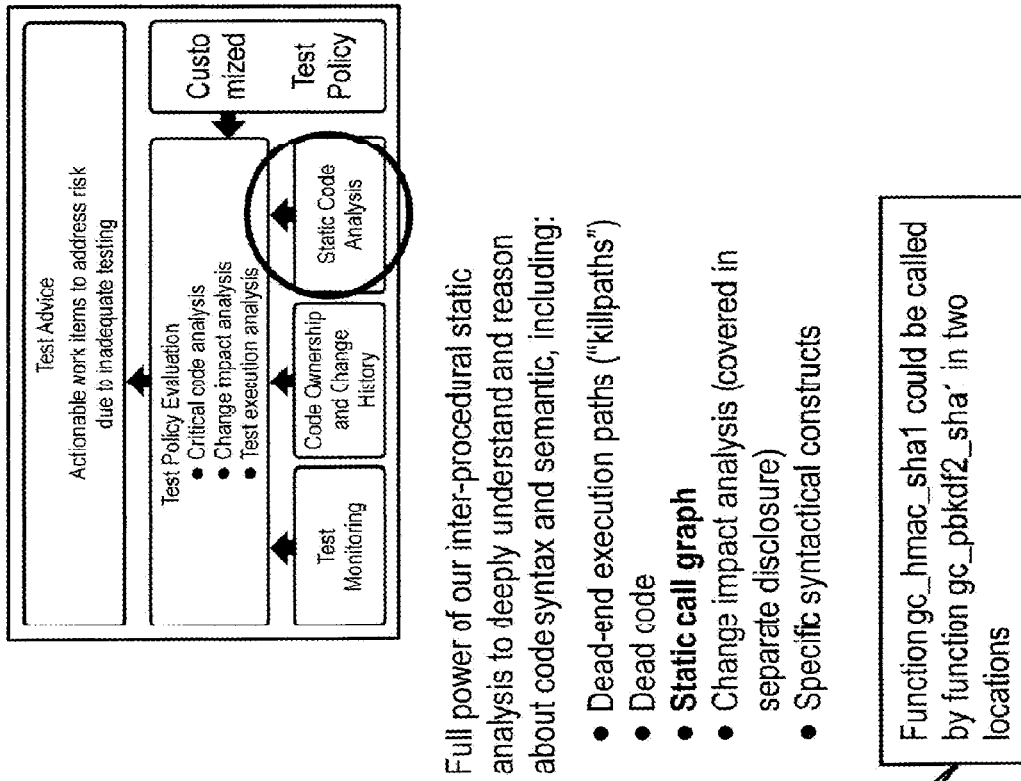

FIG. 11C is an illustrative drawing of the example code with annotations to indicate that a static call graph in which a function can be called in two locations within another function. In this example, assume that the specification 254 is used to communicate a directive to the static analysis module 212 to use a checker that determines that the function gc_hmac_sha1 within the example code could be called by function gc_pbkdf2_sha1 in two locations. In accordance with some embodiments, the code, which is determined to be static call graph code relating to both calls to the function gc_hmac_sha1, is communicated to the test analysis module 224, and code filter generation module 302, generates a STA filter element (e.g., filter 604) so as to include that code within testing.

Figure 11D:
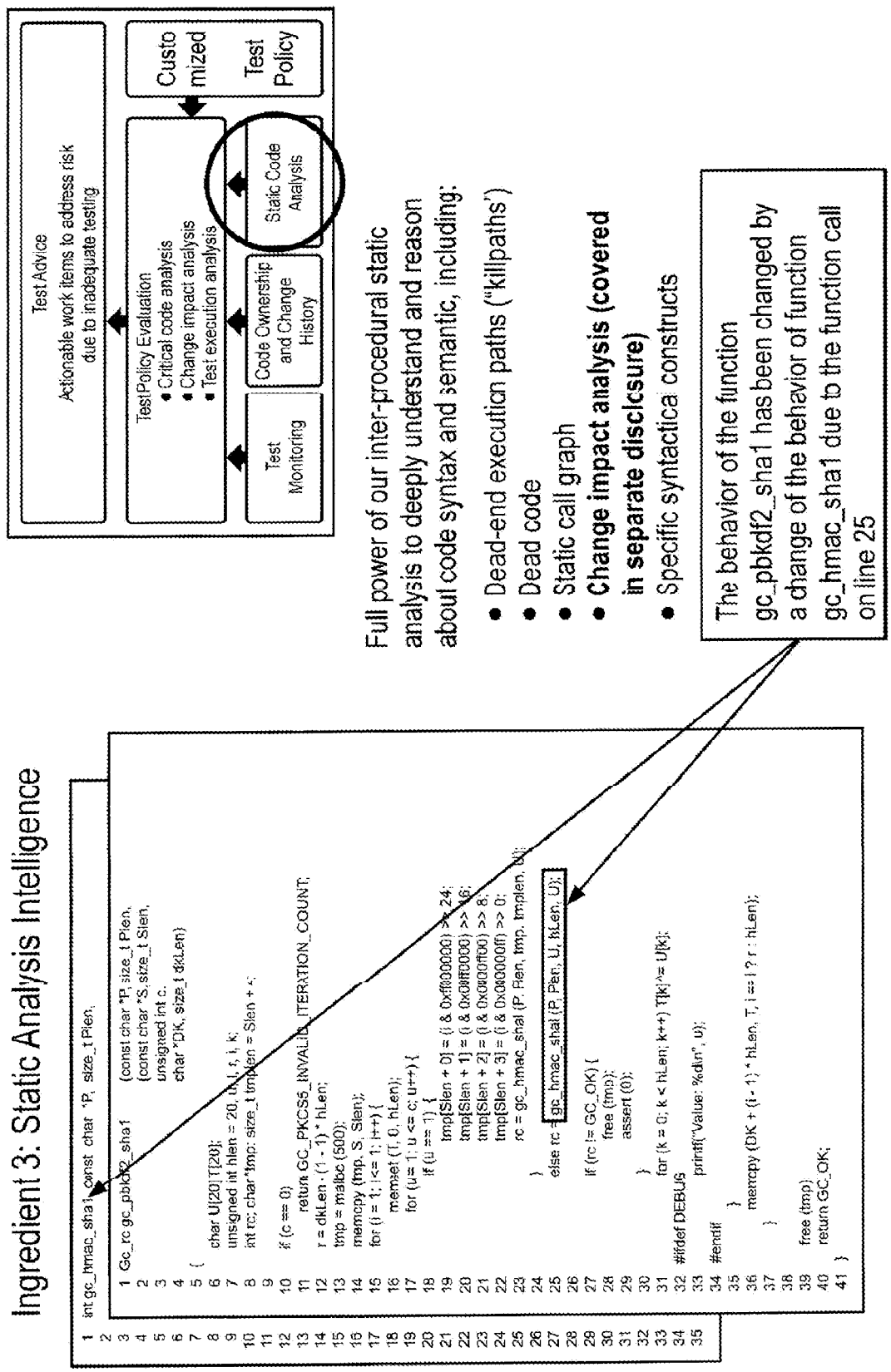

FIG. 11D is an illustrative drawing of the example code with annotations to indicate that a change in a function in one part of the example code has an impact upon a function elsewhere in other code. Assume in this example that the behavior of the function gc_pbkdf2_sha1 has been changed by a change of the behavior of function gc_hmac_sha1 due to the function call on line 25 of the example code. Further assume in this example, that the specification 254 is used to communicate a directive to the static analysis module 212 to use a checker that can identify changes in code such as a function, header, type or global variable in one part of the code that can have an impact in another part of the code. In accordance with some embodiments, the second static analysis results 220 produced by the static analysis module 212 would indicate that other code such as the function gc_pbkdf2_sha1 could be impacted by a change in the gc_hmac_sha1. In accordance with some embodiments, code of other functions located elsewhere in the code that call the changed function gc_pbkdf2_sha1 and that could be impacted by a change in that function are communicated to the test analysis module 224, and code filter generation module 302, generates a STA filter element (e.g., filter 604) so as to include those other functions within testing. In other words, an SA filter produced in response to identification of code that could be impacted by a change in some other code, the gc_hmac_sha1 code in this example, results in code from the AST 210 that matches the identified potentially impacted code being included in testing, other functions located elsewhere in the code that call the changed function gc_pbkdf2_sha1. Commonly owned U.S. Patent Application Ser. No. 61/706, 819, filed Sep. 28, 2012, Change Impact Analysis, discloses a method and apparatus for change impact analysis, which is expressly incorporated herein by this reference.

Figure 11E:
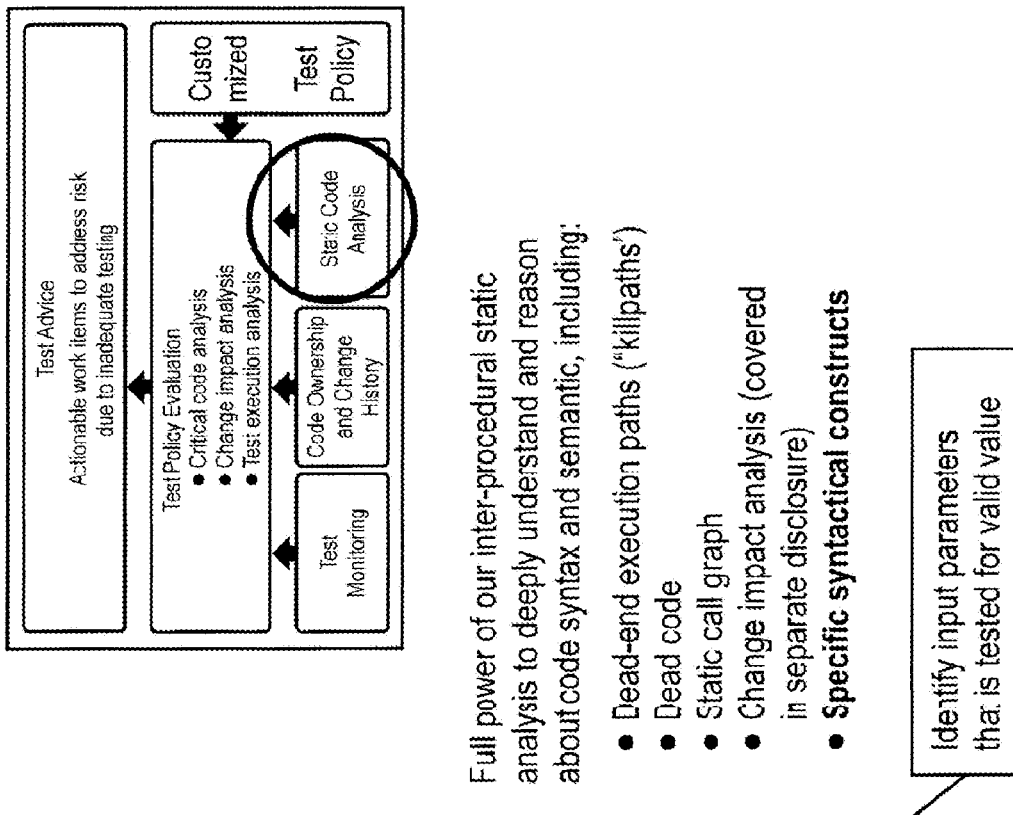

FIG. 11E is an illustrative drawing of the example code with annotations to indicate that a part of the example code that has been examined for a particular syntactical construct. In this example the syntactical construct "if (c==0)" indicates that the variable "c" is an input parameter. As a general rule, input parameters must be tested. Assume that the specification 254 is used to communicate a directive to the static analysis module 212 to use a checker that can identify input parameters that should be tested. In accordance with some embodiments, the code that includes the input parameter c is communicated to the test analysis module 224, and code filter generation module 302, generates a STA filter element (e.g., filter 604) so as to include that code within testing. In other words, an STA filter element filter produced in response to the checker that identifies code that includes the input parameter c in code from the AST 210 that matches the identified static call graph codes being included in testing.

Figure 11F:
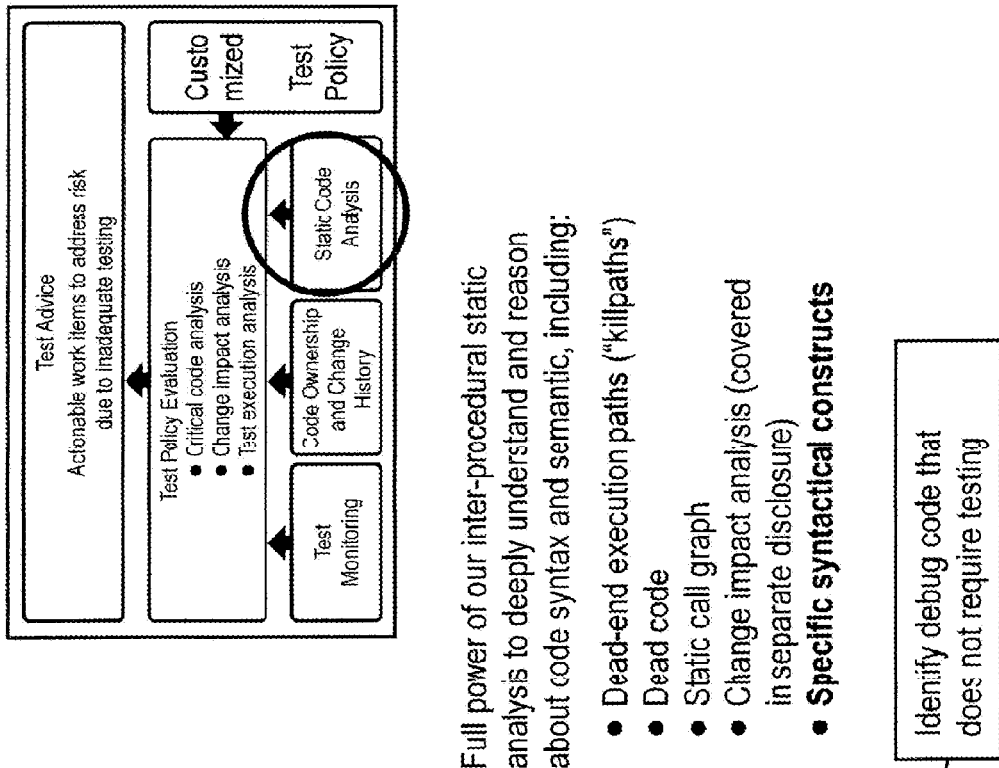

FIG. 11F is an illustrative drawing of the example code with annotations to indicate another part of the example code that has been examined for a particular syntactical construct.

In this example the syntactical construct indicates that the code is debug code that does not require testing. Assume that the specification 254 is used to communicate a directive to the static analysis module 212 to use a checker that can identify debug code that does not require testing. In accordance with some embodiments, the debug code is communicated to the test analysis module 224, and code filter generation module 302, generates a STA filter element (e.g., one of the filters 606-610) so as to include or exclude that code from testing.

Figure 12:
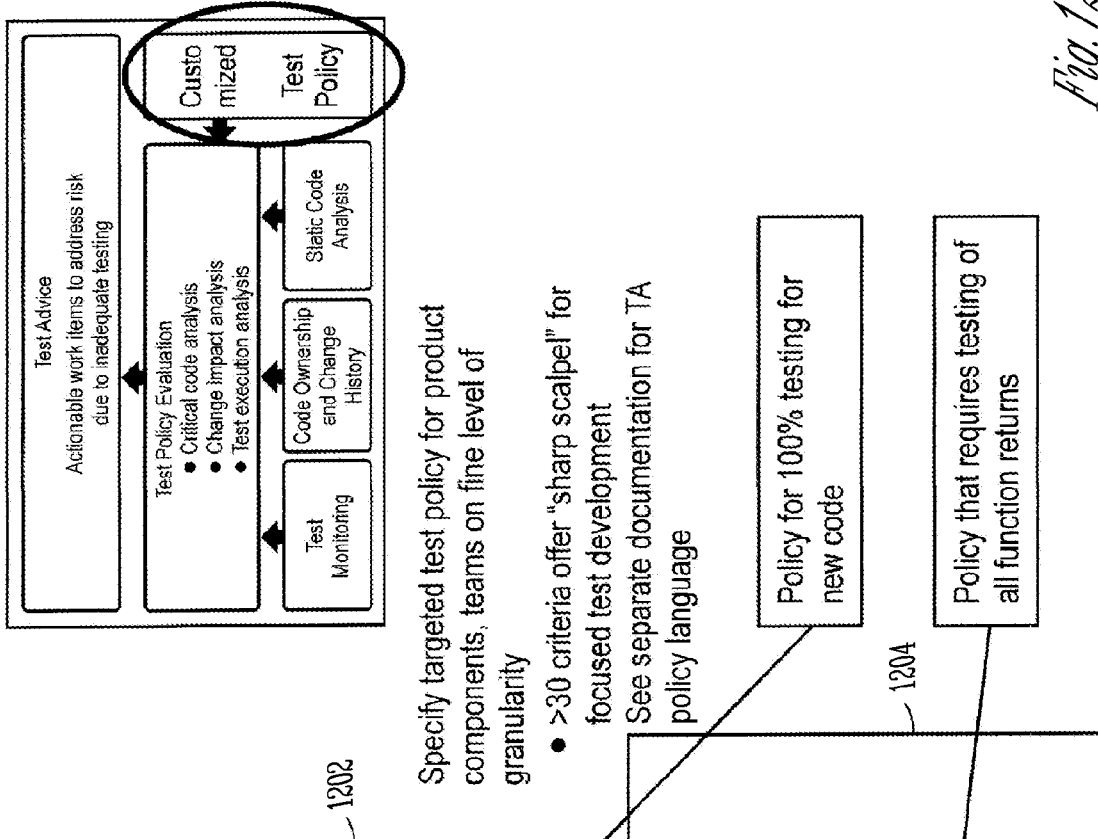
FIG. 12 is an illustrative drawing showing two example test policies in accordance with some embodiments.

FIG. 12 is an illustrative drawing showing two example test policies in accordance with some embodiments. Test specification policy 1202 requires testing of all aspects of new code developed, changed or added to since Jan. 1, 2012. Test specification policy 1204 requires testing of all function returns and is not limited by date.

Figure 13:
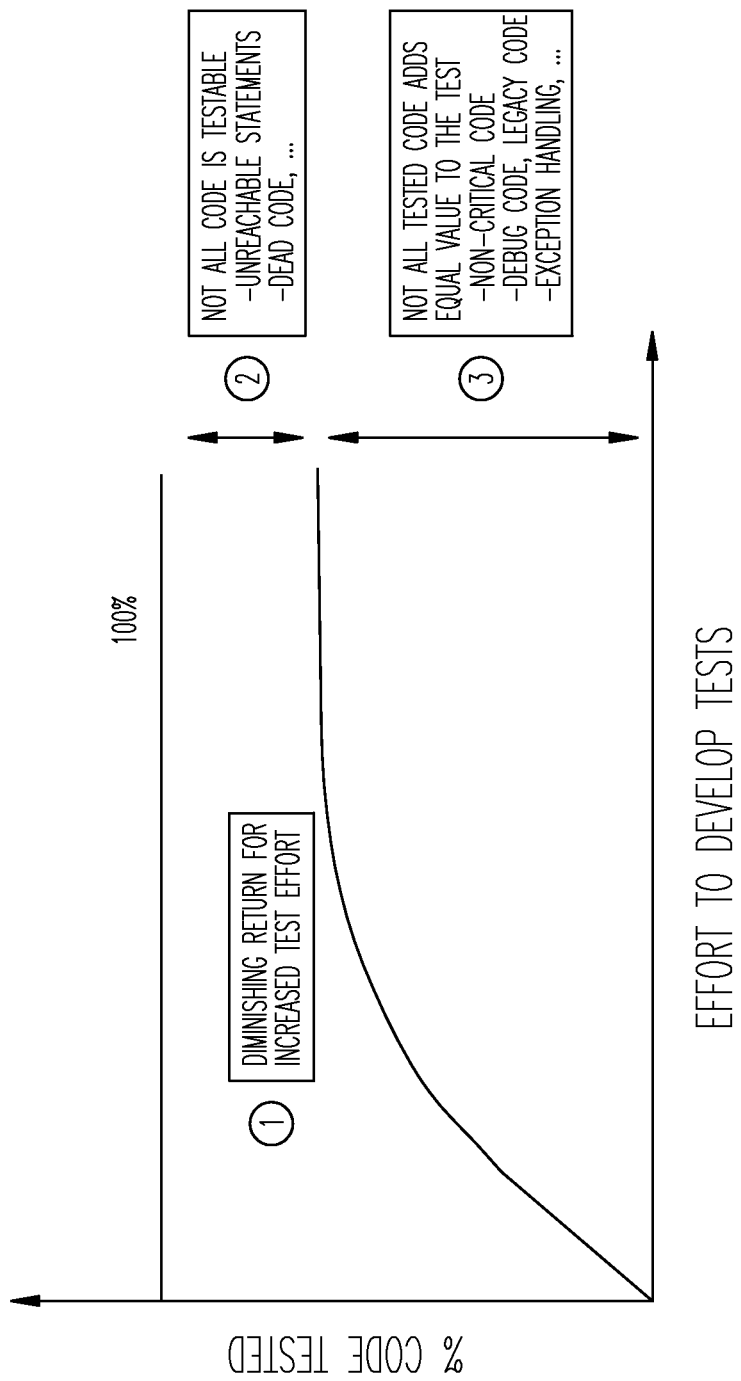
FIG. 13 is an illustrative graph representing in conceptual terms a relationship between percentage code tested versus effort to develop tests to test the code.

FIG. 13 is an illustrative graph representing in conceptual terms a relationship between percentage code tested versus effort to develop tests to test the code. It will be appreciated from the graph that as a higher and higher percentages of the code are tested, the effort required to create additional tests to test the remaining untested code increases. Thus, in general, after some level of testing has been completed there is a diminishing test benefit return with increased test effort. Thus, it is advantageous to identify portions of code that need not be tested so as to not waste effort attempting to test that code. For example, it can be a waste of effort to attempt to test code that is not testable (e.g., unreachable code statements or dead end code). Also, not all tested code adds equal value to the testing. For example, testing non-critical code such as debug code, legacy code or exception handling code may not be a good use of testing resources. It will be appreciated that the embodiments disclosed herein identify code that is to be excluded from testing so as to improve test development efficiency by avoiding unnecessary tests. The embodiments disclosed herein also identify code that might have been overlooked for testing, such as code that is susceptible to change impact as a result of changes in other code, for example.

Moreover, the portion of computer program code to be subject to testing can be specified using a test specification that can be created by a user. In some embodiments, the test specification provides SCM parameters, for example, used to identify code from an SCM that should be included or excluded in dynamic testing. In some embodiments, the test specification also provides SA parameters, for example, used to run static analyses to identify code that should be included or excluded in dynamic testing. The identified code is used to modify the computer program code generate modified code to compare with dynamic test results to evaluate the dynamic test results.

Hardware Environment

Figure 14:
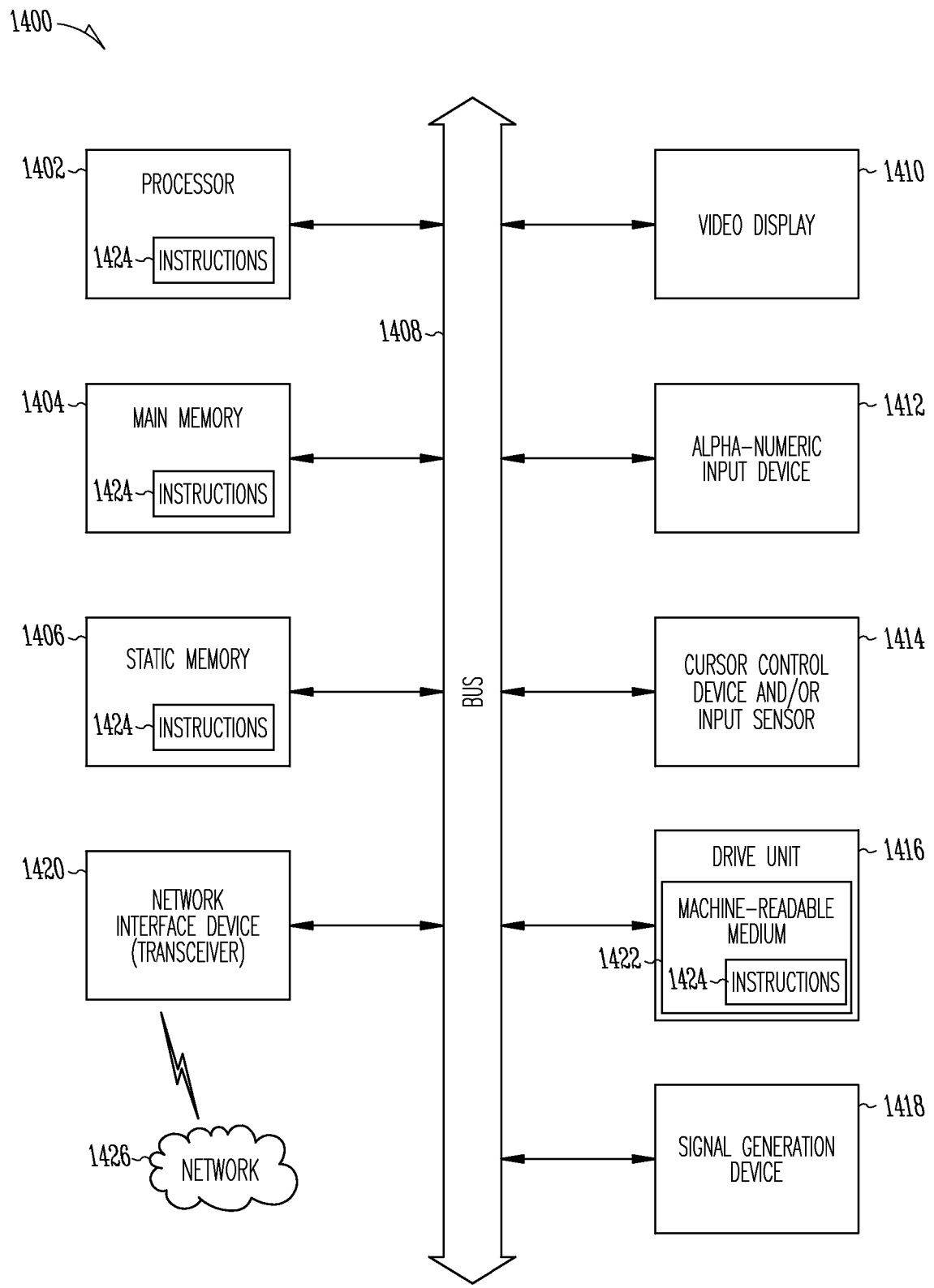
FIG. 14 shows a diagrammatic representation of a machine in the example form of a computer system within which a set of instructions, for causing the machine to perform any one or more of the methodologies discussed herein, may be executed.

FIG. 14 shows a diagrammatic representation of a machine in the example form of a computer system 1400 within which a set of instructions, for causing the machine to perform any one or more of the methodologies discussed herein, may be executed. The computer system 1400 can comprise, for example, can be configured to implement a static analysis tool and a dynamic analysis tool, for example. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU), or both), a main memory 1404 and a static memory 1406, which communicate with each other via a bus 1408. The computer system 1400 may further include a video display unit 1410 (e.g., liquid crystal display (LCD), organic light emitting diode (OLED) display, touch screen, or a cathode ray tube (CRT), for example. The computer system 1400 also includes an alphanumeric input device 1412 (e.g., a keyboard, a physical keyboard, a virtual keyboard using software), a cursor control device or input sensor 1414 (e.g., a mouse, a trackpad, a trackball, a sensor or reader, a machine readable information reader, bar code reader), a disk drive unit 1416, a signal generation device 1418 (e.g., a speaker) and a network interface device or transceiver 1420.

The disk drive unit 1416 includes a non-transitory machine-readable storage device medium 1422 on which is stored one or more sets of instructions (e.g., software 1424) embodying any one or more of the methodologies or functions described herein, such as the processes of FIGS. 2-5B. The software 1424 may also reside, completely or at least partially, within the main memory 1404 and/or within the processor 1402 during execution thereof by the computer system 1400, the main memory 1404 and the processor 1402 also constituting non-transitory machine-readable storage device media. The non-transitory machine-readable storage device medium 1422 also can store an integrated circuit design and waveform structures.

The instructions 1424 may further be transmitted or received over a network 1426 via the network interface device 1420.

While the machine-readable medium 1422 is shown in an example embodiment to be a single medium, the term "machine-readable medium," "computer readable medium," and the like should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from the present disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present disclosure has been described in connection with some embodiments, it is not intended to be limited to the specific form set forth herein. One skilled in the art would recognize that various features of the described embodiments may be combined in accordance with the present disclosure. Moreover, it will be appreciated that various modifications and alterations may be made by those skilled in the art without departing from the spirit and scope of the present disclosure.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A method to evaluate tests of computer program code comprising:
   receiving, in a computer readable storage device, user input to designate a static analysis checker tool to use to identify a code portion within the computer program code;
   receiving, in the computer readable storage device, user input to designate a code range within the computer program code;
   configuring a computer to perform one or more dynamic tests of computer program code;
   capturing, in a computer readable storage device, test results that indicate portions of the computer program code that have been tested using the one or more dynamic tests;
   configuring a computer to produce, in a computer readable storage device, based at least in part upon the user input, a code filter to indicate one or more respective portions of the computer program code to respectively either omit from or to include in a determination of adequacy of the captured test results;
   wherein producing the code filter includes configuring the computer to use the checker tool to produce, in the computer readable storage device, a first filter element to indicate code from the computer program code that corresponds to the code portion identified using the designated checker tool;
   wherein producing the code filter includes configuring the computer to use a code modification history to produce, in the computer readable storage device, a second filter element to indicate code from the computer program code that corresponds to the designated code range; and
   filtering the computer program code using the produced code filter to produce filtered computer program code; and
   generating a test result indication by comparing the captured test results that indicate portions of the computer program code that have been tested with the filtered computer program code to provide an indication of adequacy of the captured test results coverage.

2. The method of claim 1,
wherein the code filter indicates specific lines of code.

3. The method of claim 1,
wherein the code filter indicates specific branches of conditional execution of code.

4. The method of claim 1,
wherein the code filter indicates specific conditional execution sequences of code.

5. The method of claim 1,
wherein the code filter indicates specific values of code variables.

6. The method of claim 1,
wherein the code filter indicates a specific sequence of code statements.

7. The method of claim 1,
wherein the code filter indicates specific file.

8. The method of claim 1,
wherein the code filter indicates a specific function.

9. The method of claim 1,
wherein test results indicate one or more branches of conditional execution of code within the computer program code have been tested; and
wherein the act of comparing includes comparing the results of testing the one or more branches of conditional execution of code with the computer program code filtered by the code filter.

10. The method of claim 1,
wherein test results indicate one or more conditional execution sequences of code within the computer program code have been tested; and
wherein the act of comparing includes comparing the results of testing the one or more conditional execution sequences of code with the computer program code filtered by the code filter.

11. The method of claim 1 further including:
receiving, in a computer readable storage device, user input specifying one or more values of one or more code variables; and
wherein test results indicate one or more values of code variables within the computer program code have been tested; and
wherein the act of comparing includes comparing the results of testing the one or more values of code variables with the specified one or more values of one or more code variables.

12. The method of claim 1,
wherein test results indicate one or more sequence of code statements within the computer program code have been executed; and
wherein the act of comparing includes comparing the results of testing the one or more sequence of code statements with the computer program code filtered by the code filter.

13. The method of claim 1,
wherein test results indicate one or more files within the computer program code have been tested; and
wherein the act of comparing includes comparing the results of testing the one or more files with the computer program code filtered by the code filter.

14. The method of claim 1,
wherein test results indicate one or more functions within the computer program code have been tested; and
wherein the act of comparing includes comparing the results of testing the one or more functions with the computer program code filtered by the code filter.

15. The method of claim 1,
wherein configuring the computer to produce the code filter includes using the static analysis checker tool to identify one or more kill path code in the computer program code and to produce the first filter to indicate to omit the kill path code from the filtered computer program code.

16. The method of claim 1,
wherein configuring the computer to produce the code filter includes using the static analysis checker tool to identify one or more dead code in the computer program code and to produce the first filter to indicate to omit the dead code from the filtered computer program code.

17. The method of claim 1,
wherein configuring the computer to produce the code filter includes using the static analysis checker tool to identify one or more portions of code of a static call graph in the computer program code and to produce the first filter to indicate to include corresponding code relating to the static call graph in the filtered computer program code.

18. The method of claim 1,
wherein configuring the computer to produce the code filter includes using the static analysis checker tool to identify one or more portions of code of a static call graph in the computer program code and to produce the first filter to indicate to omit corresponding code relating to the static call graph in the filtered computer program code.

19. The method of claim 1,
wherein configuring the computer to produce the code filter includes using the static analysis checker tool to identify code that can be impacted by a change in other code in the computer program code and to produce the first filter to indicate to include the impacted code in the filtered computer program code.

20. The method of claim 1,
wherein configuring the computer to produce the code filter includes using the static analysis checker tool to identify code having particular syntactical constructs in the computer program code and to produce the first filter to indicate to omit the code having particular syntactical constructs from the filtered computer program code.

21. The method of claim 1,
wherein configuring the computer to produce the code filter includes using the static analysis checker tool to identify code having particular syntactical constructs in the computer program code and to produce the first filter to indicate to include the code having particular syntactical constructs from the filtered computer program code.

22. The method of claim 1,
wherein the second filter indicates one or more portions of the computer program code to include in or to omit from the filtered computer program code as a function of authorship of the indicated one or more portions.

23. The method of claim 1,
wherein the second filter indicates one or more portions of the computer program code to include in or to omit from the filtered computer program code as a function of time or times of modification or of creation of the indicated one or more portions.

24. The method of claim 1,
wherein the one or more dynamic tests of computer program code include tests of one or more lines of code within the computer program code; and wherein the act of comparing includes comparing the results of testing the one or more lines of code with the one or more respective portions of the computer program code filtered by the code filter.

25. The method of claim 1,
wherein the one or more dynamic tests of computer program code include tests of one or more lines of code within the computer program code; and
wherein the act of comparing includes comparing the results of testing the one or more lines of code with the one or more respective portions of the computer program code filtered by the first filter.

26. The method of claim 1,
wherein the one or more dynamic tests of computer program code include tests of one or more lines of code within the computer program code; and
wherein the act of comparing includes comparing the results of testing the one or more lines of code with the one or more respective portions of the computer program code filtered by the second filter.

27. The method of claim 1,
wherein the one or more dynamic tests of computer program code include tests of one or more lines of code within the computer program code; and
wherein the act of comparing includes comparing the results of testing the one or more lines of code with the one or more respective portions of the computer program code filtered by the first filter and with the one or more respective portions of the computer program code filtered by the second filter.

28. An article of manufacture that includes a non-transitory computer readable storage device that includes program code to configure a computer to perform a process comprising:
receiving, in a computer readable storage device, user input to designate a static analysis checker tool to use to identify a code portion within the computer program code;
receiving, in the computer readable storage device, user input to designate a code range within the computer program code;
configuring a computer to perform one or more dynamic tests of computer program code;
capturing, in a computer readable storage device, test results that indicate portions of the computer program code that have been tested using the one or more dynamic tests;
configuring a computer to produce, in a computer readable storage device, based at least in part upon the user input, a code filter to indicate one or more respective portions of the computer program code to respectively either omit from or to include in a determination of adequacy of the captured test results;
wherein producing the code filter includes configuring the computer to use the checker tool to produce, in the computer readable storage device, a first filter element to indicate code from the computer program that corresponds to a code portion identified using the designated checker tool;
wherein producing the code filter includes configuring the computer to use a code modification history to produce, in the computer readable storage device, a second filter element to indicate code from the computer program code that corresponds to the designated code range; and
filtering the computer program code using the produced code filter to produce filtered computer program code; and
generating a test result indication by comparing the captured test results that indicate portions of the computer program code that have been tested with the filtered computer program code to provide an indication of adequacy of the captured test results coverage.

29. The method of claim 1,
wherein the first filter element indicates whether to include or omit the indicated code from the computer program code that corresponds to the designated checker result.

30. The method of claim 1,
wherein the second filter element indicates whether to include or omit the indicated code from the computer program code that corresponds to the designated code range.

31. The method of claim 1,
wherein filtering the computer program code using the produced code filter includes giving precedence to first filter element over the second filter element when the first and second filter elements indicate competing filter actions.

32. The method of claim 1,
wherein the first filter element indicates one of to include or to omit the indicated code from the computer program code that corresponds to the designated checker result;
wherein the second filter element indicates one of to include or to omit the indicated code from the computer program code that corresponds to the designated code range; and
wherein filtering the computer program code includes applying a rule to determine precedence between the first filter element and the second filter element when the first and second filter elements indicate competing filter actions.

33. The method of claim 1 further including:
receiving, in a computer readable storage device, user input to designate to include the checker result;
wherein filtering the computer program code using the produced code filter includes, including in the filtered computer program code, code that corresponds to the designated checker result.

34. The method of claim 1 further including:
receiving, in a computer readable storage device, user input to designate to omit the checker result;
wherein filtering the computer program code using the produced code filter includes, omitting from the filtered computer program code, code that corresponds to the designated checker result from the filtered computer program code.

35. The method of claim 1 further including:
receiving, in a computer readable storage device, user input to designate to include the code range;
wherein filtering the computer program code using the produced code filter includes, including in the filtered computer program code, code that corresponds to the designated code range in the filtered computer program code.

36. The method of claim 1 further including:
receiving, in a computer readable storage device, user input to designate to omit the code range;
wherein filtering the computer program code using the produced code filter includes, omitting from the filtered computer program code, code that corresponds to the designated code range from the filtered computer program code.

37. The method of claim 1 further including:
receiving, in a computer readable storage device, user input to define precedence between the first filter and the second filter;

wherein filtering the computer program code using the produced code filter includes, using the defined precedence to determine which filter to apply when the first and second filters indicate overlapping code.

38. The method of claim 1 further including:

receiving, in a computer readable storage device, user input to designate a specific portion of the computer program code to be tested using dynamic tests; and determining whether a portion of the captured test results that encompasses test results for the filtered computer program code indicates adequate testing of the designated specific code portion of the computer program code.

39. The method of claim 38, wherein the received user input designates a specific portion that includes particular lines of code the from the computer program code; and wherein determining includes determining whether the portion of the captured test results that encompasses test results for the filtered computer program code indicates that the particular lines of code have been tested adequately.

40. The method of claim 38, wherein the received user input designates a specific branch conditional execution of code from the from the computer program code; and wherein determining includes determining whether the portion of the captured test results that encompasses test results for the filtered computer program code indicates that the specific branch conditional execution has been tested adequately.

41. The method of claim 38, wherein the received user input designates a specific conditional execution sequence of code from the computer program code; and wherein determining includes determining whether the portion of the captured test results that encompasses test results for the filtered computer program code indicates that the specific conditional execution sequence has been tested adequately.

42. The method of claim 38, wherein the received user input designates a specific values of code variables of code from the computer program code; and wherein determining includes determining whether the portion of the captured test results that encompasses test results for the filtered computer program code indicates that the specific values of code variables of code statements have been tested adequately.

43. The method of claim 38, wherein the received user input designates a specific sequence of code statements from the computer program code; and wherein determining includes determining whether the portion of the captured test results that encompasses test results for the filtered computer program code indicates that the specific sequence of code statements has been tested adequately.

\* \* \* \* \*